United States Patent
Bruck et al.

(10) Patent No.: US 7,299,294 B1
(45) Date of Patent: Nov. 20, 2007

(54) DISTRIBUTED TRAFFIC CONTROLLER FOR NETWORK DATA

(75) Inventors: Jehoshua Bruck, La Canada, CA (US);
Vasken Bohossian, Pasadena, CA (US);
Chenggong Fan, Pasadena, CA (US);
Paul LeMahieu, Pasadena, CA (US);
Philip Love, Pasadena, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/548,188

(22) Filed: Apr. 12, 2000

Related U.S. Application Data

(63) Continuation of application No. 09/437,637, filed on Nov. 10, 1999, now abandoned.

(51) Int. Cl.
*G06F 15/16* (2006.01)
(52) U.S. Cl. ............ 709/235; 709/201; 709/217; 709/222; 709/225; 709/230; 709/238; 709/245; 709/250; 711/6; 711/203
(58) Field of Classification Search ............ 709/222, 709/230, 232, 238, 244, 245, 251, 201, 217, 709/219, 227, 250, 225, 229, 234, 235, 241; 711/6, 203
See application file for complete search history.

(56) References Cited

U.S. PATENT DOCUMENTS 4,792,941 A * 12/1988 Yanosy et al. ............ 370/232
5,191,651 A * 3/1993 Halim et al. ............ 709/250

(Continued)

FOREIGN PATENT DOCUMENTS

WO 9826559 6/1998

(Continued)

OTHER PUBLICATIONS

Caruso, J. "NASA-funded software aids reliabillity," CNN.com-Dec. 22, 1999 http://www/cnn.com/1999/TECH/computing/12/22/nasa.software.idg/index.html.

(Continued)

*Primary Examiner*—Michael Won
(74) *Attorney, Agent, or Firm*—Barry N. Young

(57) ABSTRACT

A distributed gateway for controlling computer network data traffic dynamically reconfigures traffic assignments among multiple gateway machines for increased network availability. If one of the distributed gateway machines becomes unavailable, traffic assignments are moved among the multiple machines such that network availability is substantially unchanged. The machines of the distributed gateway form a cluster and communicate with each other using a Group Membership protocol word such that automatic, dynamic traffic assignment reconfiguration occurs in response to machines being added and deleted from the cluster, with no loss in functionality for the gateway overall, in a process that is transparent to network users, thereby providing a distributed gateway functionality that is scalable. Operation of the distributed gateway remains consistent as machines are added and deleted from the cluster. A scalable, distributed, highly available, load balancing network gateway is thereby provided, having multiple machines that function as a front server layer between the network and a back-end server layer having multiple machines functioning as Web file servers, FTP servers, or other application servers. The front layer machines comprise a server cluster that performs fail-over and dynamic load balancing for both server layers.

75 Claims, 17 Drawing Sheets

U.S. PATENT DOCUMENTS

| | | | | |
|---|---|---|---|---|
| 5,341,477 A | * | 8/1994 | Pitkin et al. | 709/226 |
| 5,452,291 A | * | 9/1995 | Eisenhandler et al. | 370/402 |
| 5,530,897 A | * | 6/1996 | Meritt | 710/9 |
| 5,550,816 A | * | 8/1996 | Hardwick et al. | 370/397 |
| 5,636,216 A | * | 6/1997 | Fox et al. | 370/402 |
| 5,729,681 A | * | 3/1998 | Aditya et al. | 709/230 |
| 5,774,660 A | | 6/1998 | Brendel et al. | 395/200 |
| 5,774,668 A | * | 6/1998 | Choquier et al. | 709/223 |
| 5,790,804 A | * | 8/1998 | Osborne | 709/245 |
| 5,825,772 A | * | 10/1998 | Dobbins et al. | |
| 5,835,725 A | * | 11/1998 | Chiang et al. | |
| 5,892,925 A | * | 4/1999 | Aditya et al. | |
| 5,898,830 A | | 4/1999 | Wesinger et al. | 395/187.01 |
| 5,963,720 A | | 10/1999 | Grossman | |
| 6,006,259 A | * | 12/1999 | Adelman et al. | 709/223 |
| 6,047,324 A | * | 4/2000 | Ford et al. | |
| 6,073,178 A | | 6/2000 | Wong et al. | 709/229 |
| 6,088,330 A | | 7/2000 | Bruck et al. | 370/228 |
| 6,091,951 A | * | 7/2000 | Sturniolo et al. | 455/432.2 |
| 6,101,552 A | * | 8/2000 | Chiang et al. | 709/229 |
| 6,104,870 A | * | 8/2000 | Frick et al. | 703/27 |
| 6,128,277 A | | 10/2000 | Bruck et al. | 370/221 |
| 6,131,112 A | * | 10/2000 | Lewis et al. | |
| 6,154,465 A | * | 11/2000 | Pickett | 370/466 |
| 6,167,054 A | | 12/2000 | Simmons et al. | 370/422 |
| 6,243,360 B1 | | 6/2001 | Basilico | 370/231 |
| 6,249,801 B1 | * | 6/2001 | Zisapel et al. | 718/105 |
| 6,253,326 B1 | * | 6/2001 | Lincke et al. | |
| 6,253,327 B1 | * | 6/2001 | Zhang et al. | 726/14 |
| 6,304,558 B1 | * | 10/2001 | Mysore | 370/312 |
| 6,314,475 B1 | | 11/2001 | Collin et al. | 710/15 |
| 6,324,177 B1 | * | 11/2001 | Howes et al. | 370/389 |
| 6,327,628 B1 | | 12/2001 | Anuff et al. | 703/311 |
| 6,353,858 B1 | | 3/2002 | Raamot et al. | 709/249 |
| 6,374,299 B1 | * | 4/2002 | Ford et al. | |
| 6,392,990 B1 | * | 5/2002 | Tosey et al. | 370/218 |
| 6,411,685 B1 | * | 6/2002 | ONeal | |
| 6,415,323 B1 | * | 7/2002 | McCanne et al. | 709/225 |
| 6,424,992 B2 | * | 7/2002 | Devarakonda et al. | |
| 6,452,925 B1 | * | 9/2002 | Sistanizadeh et al. | 370/352 |
| 6,469,998 B1 | * | 10/2002 | Burgaleta Salinas et al. | 370/338 |
| 6,480,508 B1 | | 11/2002 | Mwikalo et al. | |
| 6,490,289 B1 | * | 12/2002 | Zhang et al. | 370/401 |
| 6,507,908 B1 | * | 1/2003 | Caronni | 713/153 |
| 6,587,455 B1 | * | 7/2003 | Ray et al. | 370/352 |
| 6,721,907 B2 | * | 4/2004 | Earl | 714/57 |
| 6,748,499 B2 | * | 6/2004 | Beukema et al. | 711/147 |
| 6,760,775 B1 | * | 7/2004 | Anerousis et al. | 709/238 |
| 6,785,704 B1 | * | 8/2004 | McCanne | 718/105 |
| 6,845,091 B2 | * | 1/2005 | Ogier et al. | 370/338 |
| 6,917,626 B1 | * | 7/2005 | Duvvury | 370/466 |
| 6,934,765 B2 | * | 8/2005 | Held et al. | 709/245 |
| 6,944,785 B2 | * | 9/2005 | Gadir et al. | 714/4 |
| 6,957,276 B1 | * | 10/2005 | Bahl | 709/245 |
| 6,996,628 B2 | * | 2/2006 | Keane et al. | 709/238 |

FOREIGN PATENT DOCUMENTS

| | | |
|---|---|---|
| WO | WO 99/17217 | 4/1999 |
| WO | 9933227 | 7/1999 |

OTHER PUBLICATIONS

Press Release: "Rainfinity Unveils Rainwall -Industry's First Fully Distributed Clustering Solution for Internet Gateways," Spring Internet World '99, Los Angeles, CA -Apr. 14, 1999.

Goldszmidt, G. S., "Load management for scaling up internet services" IEEE Network Operations and Management Symposium, US, New York, NY: IEEE vol. Conf. 10, pp. 828-835, Feb. 15, 1998.

International Search Report mailed on Oct. 6, 2000 for PCT Application PCT/US00/09966.

* cited by examiner

DISTRIBUTED TRAFFIC CONTROLLER FOR NETWORK DATA

CROSS-REFERENCE TO RELATED APPLICATIONS

This application is a continuation of U.S. patent application Ser. No. 09/437,637 entitled "Distributed Traffic Controller for Network Data", filed Nov. 10, 1999, now abandoned which is incorporated herein by reference.

BACKGROUND OF THE INVENTION

1. Field of the Invention

This invention relates to computer network data traffic and, more particularly, to controllers that manage the flow of data in a computer network.

2. Description of the Related Art

To enable sharing of data among computer users, most computer systems in use today are connected to a computer network. Computers in an office, for example, may be connected over a local area network (LAN) to gain access to a server computer, which manages common data storage. The Internet is a computer network in which literally millions of user computers communicate with server computers over a widely distributed network. The server computers may be file servers that provide data files in response to user requests, or they may perform other functions, such as e-mail processing.

Data traffic over the Internet generally follows a transportation protocol called the Transport Control Protocol/Internet Protocol (TCP/IP). Some of the data traffic involves user data messages that are sent from users over the network through routers and switches to destination computers. The destination computer may be a server computer, such as where an Internet user requests a page from a web site. In that case, a user sends a request message to a web server computer in accordance with a hypertext transfer protocol (HTTP). The request is received at the web server computer, which returns the web site data over the Internet network to the requesting user computer. Instead of a server computer, the destination computer may be another user, such as where an Internet user sends an e-mail message over the Internet to another user. In that case, a user sends an e-mail message to an outgoing mail server computer, which sends the message out over the Internet to an appropriate destination e-mail server, which then routes the message to the appropriate user computer.

Because the Internet is a public data network, there is no way to reliably ensure the integrity of data traffic being routed over the Internet. That is, so-called "hackers" may be sending computer viruses to randomly targeted destinations, or hackers may attempt to gain access to a web server computer to alter or destroy the data stored there. To protect against such malicious acts, firewall systems have been developed to screen out unwanted traffic and to protect against unauthorized intrusions.

FIG. 1 shows a conventional firewall system 100 in which a single firewall machine 102 acts as a secure gateway between the Internet 104 or other public network and two local user networks 106, 108. All traffic to and from the outside world (the Internet) must pass through the firewall machine 102. In accordance with TCP/IP addressing, Internet traffic views the address of the system 100 through an external subnet address, which in the FIG. 1 system is illustrated as the external subnet of (200.199.198.0). In this document, network addresses will be enclosed within parentheses, whether for subnets or individual host machines. Those skilled in the art will understand that the firewall machine 102 will have a machine address that is an address under the external subnet. In particular, the address of (200.199.198.1) is shown in FIG. 1 as the address, or Uniform Resource Locator (URL) of the firewall machine 102. Similarly, the two local networks 106, 108 are shown connected to the firewall machine 102, the first subnet 106 shown as the (192.168.1.0) subnet and the second subnet 108 shown as the (192.168.2.0) subnet.

To implement the firewall processing, the gateway computer 102 is loaded with firewall software programming, as well as being configured with network interfaces to each internal and external subnet 106, 108. Such firewall software is readily available and may comprise, for example, the "FireWall-1" product from Check Point Software Technologies Ltd. of Redwood City, Calif., USA.

The firewall machine 102 will have multiple Internet protocol (IP) addresses, one for each subnet. Because there is a single firewall machine, all client machines and routers of the local networks 106, 108 can simply specify the IP address of the firewall machine 102 as their default gateway for all outgoing data traffic destined for the Internet. This firewall implementation provides a simple and relatively inexpensive solution to ensuring integrity of the local networks on the "downstream" side of the gateway 102. Unfortunately, the single gateway is a single point of failure and can become a potential bottleneck for data traffic. This likely will be become more and more critical as firewall machines are asked to perform more and more tasks, such as encryption and authentication. That is, whenever the firewall machine 102 is not functioning, all of the internal, local network machines are isolated from the outside world via the Internet. The single bottleneck can be a serious problem, because even simple maintenance and upgrades on the firewall machine will be necessary from time to time, and when they occur, they will result in network downtime that will isolate the client side machines from the Internet. For many web sites, such as e-commerce sites, no amount of downtime is acceptable.

Conventionally, increased availability and reduced network downtime is provided by multiple gateway machines. In the system 200 shown in FIG. 2, a multiple gateway system is provided to the Internet 202 that is comprised of multiple firewall machines 204, 206, 208, 210. Rather than a single IP address, the gateway is identified by a single external subnet (200.199.198.0) and with an associated set of IP addresses, comprising an address pool, off that subnet and corresponding to each of the firewall machines 204, 206, 208, 210, respectively. For example, the addresses may comprise the set of (200.199.198.1), (200.199.198.2), (200.199.198.3), and (200.199.198.4).

In FIG. 2, each firewall machine 204, 206, 208, 210 is connected to two internal subnets, a first subnet 212 and a second subnet 214. Each of these internal subnets, which are local networks, can be connected to multiple local computers 216, 218, 220, such as web server or e-mail server computers. Each computer connected to either one of the internal subnets 212, 214 must select one IP address from a corresponding pool of subnet IP addresses as their default gateway address.

For example, the first subnet 212 is indicated as the (192.168.1.0) subnet, and may be associated with a pool of IP addresses comprising (192.168.1.1), (192.168.1.2), (192.168.1.3), and (192.168.1.4) addresses. Therefore, a web server 216 connected to the first subnet 212 can select either one of these four IP pool addresses as its default gateway computer for handling upstream data traffic. The second subnet 214 is indicated as the (192.168.2.0) subnet, and is shown as having an IP address pool comprising (192.168.2.1), (192.168.2.2), (192.168.2.3), and (192.168.2.4) addresses. Therefore, a web server 220 connected to the second subnet 214 can select either one of these second subnet IP addresses as its default gateway computer for handling upstream data traffic.

In the FIG. 2 system 200, if there is a failure of any gateway machine 204, 206, 208, 210 or of any network interface or software at a firewall machine, then all local network machines and routers configured to use that machine as their default gateway will lose their connection to the outside world. For example, if the web server computer 216 is configured to use the first subnet firewall machine 204 as its default gateway, and if there is a failure with that machine, then the web server 216 will lose communication with the outside world, even though there are still three remaining firewall machines 204, 206, 208 that might be able to handle data traffic from that web server. Thus, whenever a failure occurs, some local network users will be out of communication. The multiple firewall machine implementation shown in FIG. 2 therefore relieves the operational bottleneck problem described above by providing additional resources for handling data traffic, but cannot provide high availability in the case of machine failures.

From the discussion above, it should be apparent that there is a need for controlling data traffic over a network so as to provide firewall protection, relieve operational bottlenecks, and increase network availability. The present invention solves this need.

SUMMARY OF THE INVENTION

In accordance with the invention, a distributed gateway for computer network data traffic dynamically reconfigures traffic assignments among multiple machines for increased network availability. If one of the distributed gateway machines becomes unavailable, traffic assignments are moved among the multiple machines such that network availability is substantially unchanged. The machines of the distributed gateway form a cluster and communicate with each other such that automatic, dynamic traffic assignment reconfiguration occurs in response to machines being added and deleted from the cluster, with no loss in functionality for the gateway overall, in a process that is transparent to network users, thereby providing a distributed gateway functionality that is scalable. Thus, operation of the distributed gateway remains consistent as machines are added and deleted from the cluster. Each machine of the distributed gateway can continue with any applications it may be running, such as firewall software, while participating in the distributed gateway and dynamic reconfiguration processing of the present invention. In this way, the invention substantially maintains network availability regardless of machine failures, so that there is no single point of failure and no lapse in gateway functionality.

In one aspect of the invention, the machines of the distributed gateway cluster communicate with each other by passing a Group Membership protocol word among the cluster machines over the subnet network with which they are connected. The protocol word is used to inform the distributed gateway machines of the cluster status, including the status of individual machines, in a token ring arrangement. Thus, each machine of the cluster becomes aware of any problem with any of the other machines in the cluster and is aware of the operational status of each machine. With such knowledge, the machines will individually determine the traffic load being borne by the other machines. If any one machine observes that another machine is handling an excessive amount of network traffic, the observing machine will take on some of the traffic from the overloaded machine, thereby performing a load balancing operation.

In another aspect of the invention, a user can configure and monitor a machine of the distributed gateway cluster from any other machine of the cluster, and also can perform such configuration and monitoring from a remote location. Such operations can be conducted through a command line interface or through a graphical user interface (GUI) that permits real time changes in network IP address assignments.

In another aspect of the invention, a scalable, distributed, highly available, load balancing network server system is provided, having multiple machines that function as a front server layer between the network and a back-end server layer having multiple machines functioning as Web file servers, FTP servers, or other application servers. The front layer machines comprise a server cluster that performs fail-over and dynamic load balancing for both server layers. The operation of the servers on both layers is monitored, and when a server failure at either layer is detected, the system automatically shifts network traffic from the failed machine to one or more of the remaining operational machines, reconfiguring front-layer servers as needed without interrupting operation of the servers. The server system automatically accommodates additional machines in the server cluster, without service interruption. A system constructed in accordance with the invention provides a front layer server cluster that manages multiple network addresses and ensures availability of all network addresses assigned to the front layer at all times. The system operates with a dynamic reconfiguration protocol that permits reassignment of network addresses to the front layer machines. The server cluster may manage network address assignments and route network traffic, operating as a gateway, providing management of virtual network addresses such that network address assignments can be moved from gateway to gateway without requiring rebooting. Finally, the system provides symmetric routing of network traffic, guaranteeing that the incoming and outgoing traffic of the same network connection goes through the same front-layer server.

Other features and advantages of the present invention should be apparent from the following description of the preferred embodiment, which illustrates, by way of example, the principles of the invention.

DESCRIPTION OF THE PREFERRED EMBODIMENTS

Figure 1:
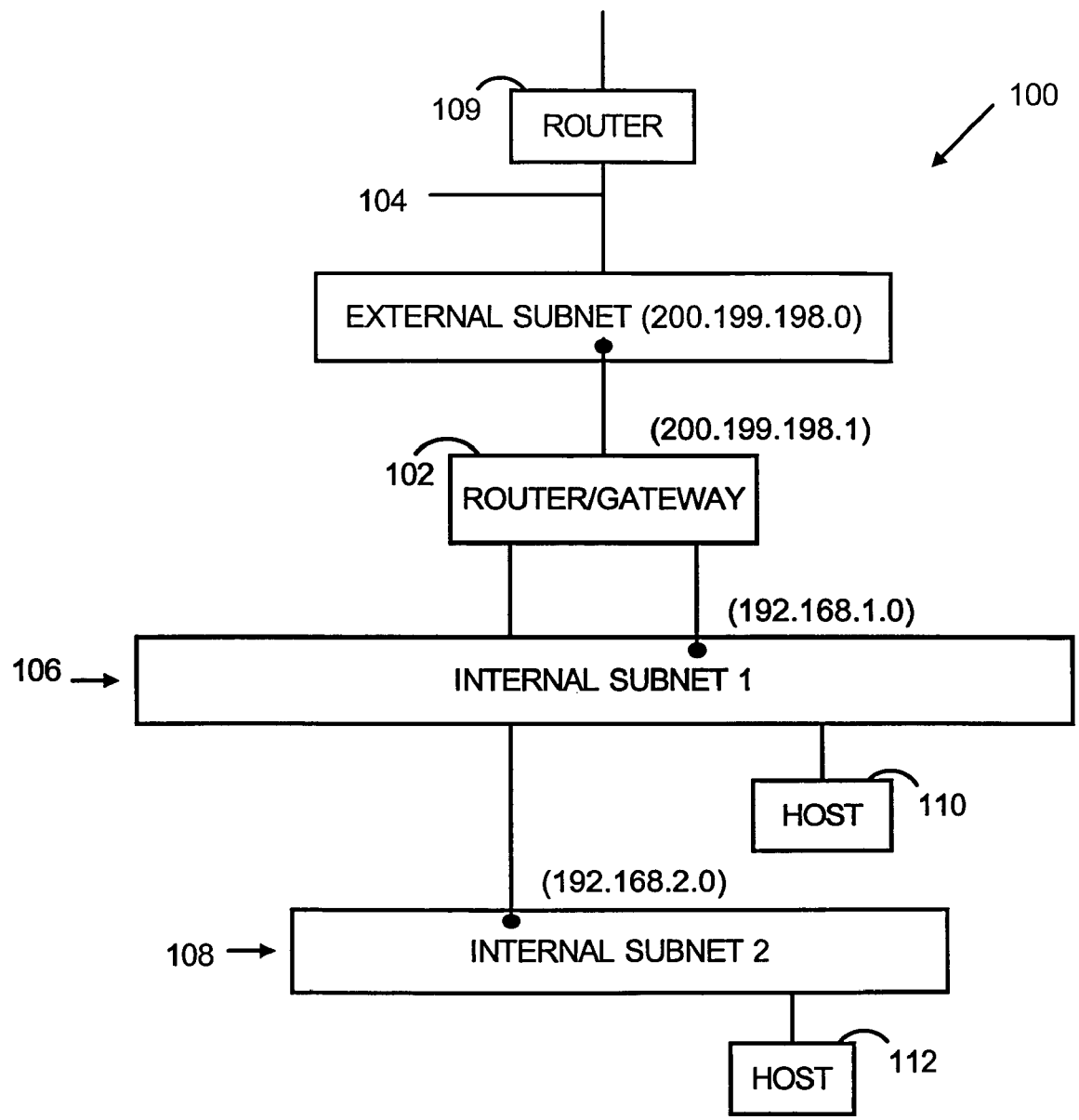
FIG. 1 is a schematic diagram of a prior art computer system in which a single firewall computer controls the flow of data traffic from a network to local network computers.
Figure 2:
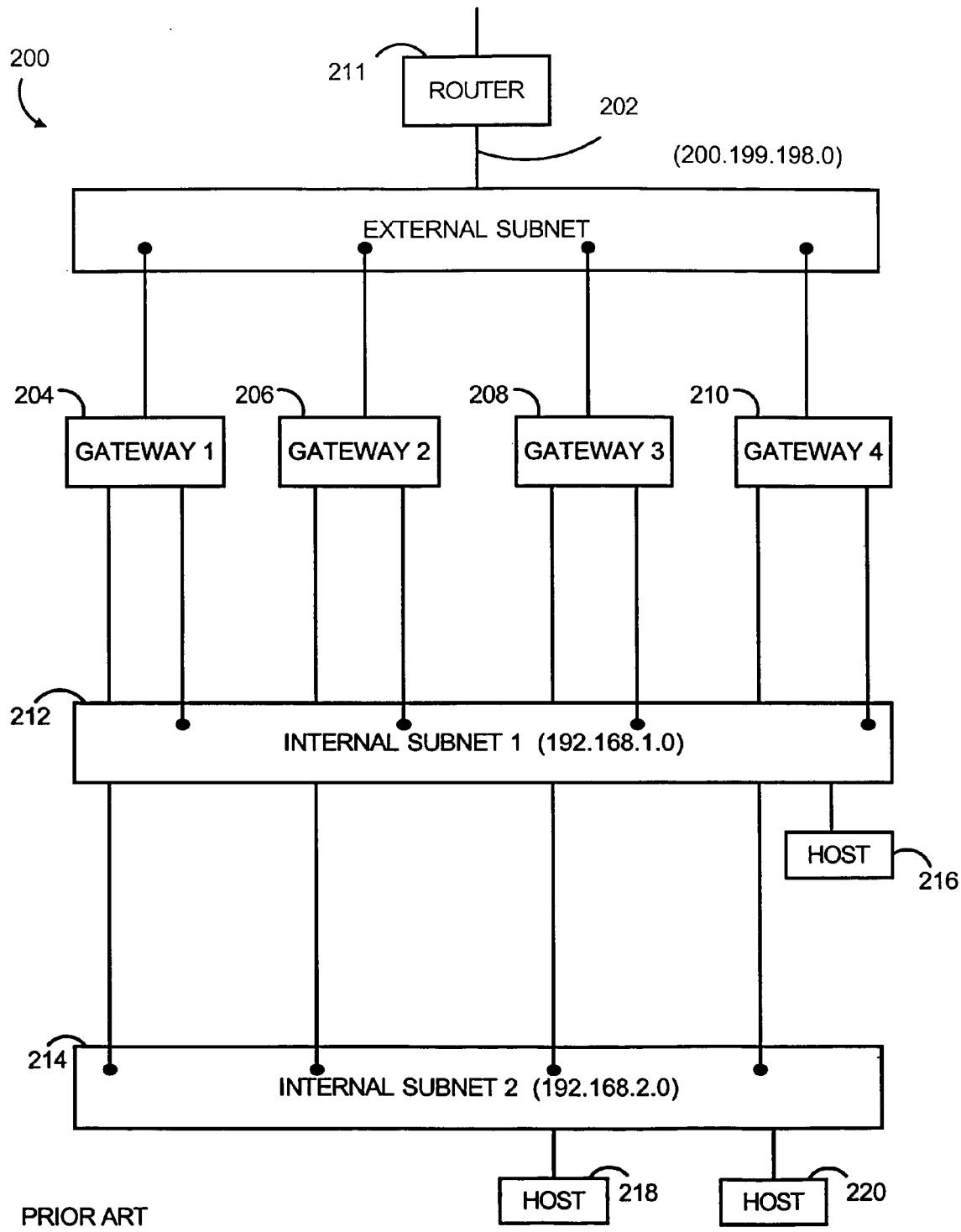
FIG. 2 is a schematic diagram of a prior art computer system in which multiple firewall computers control the flow of data traffic from a network to local network computers.
Figure 3:
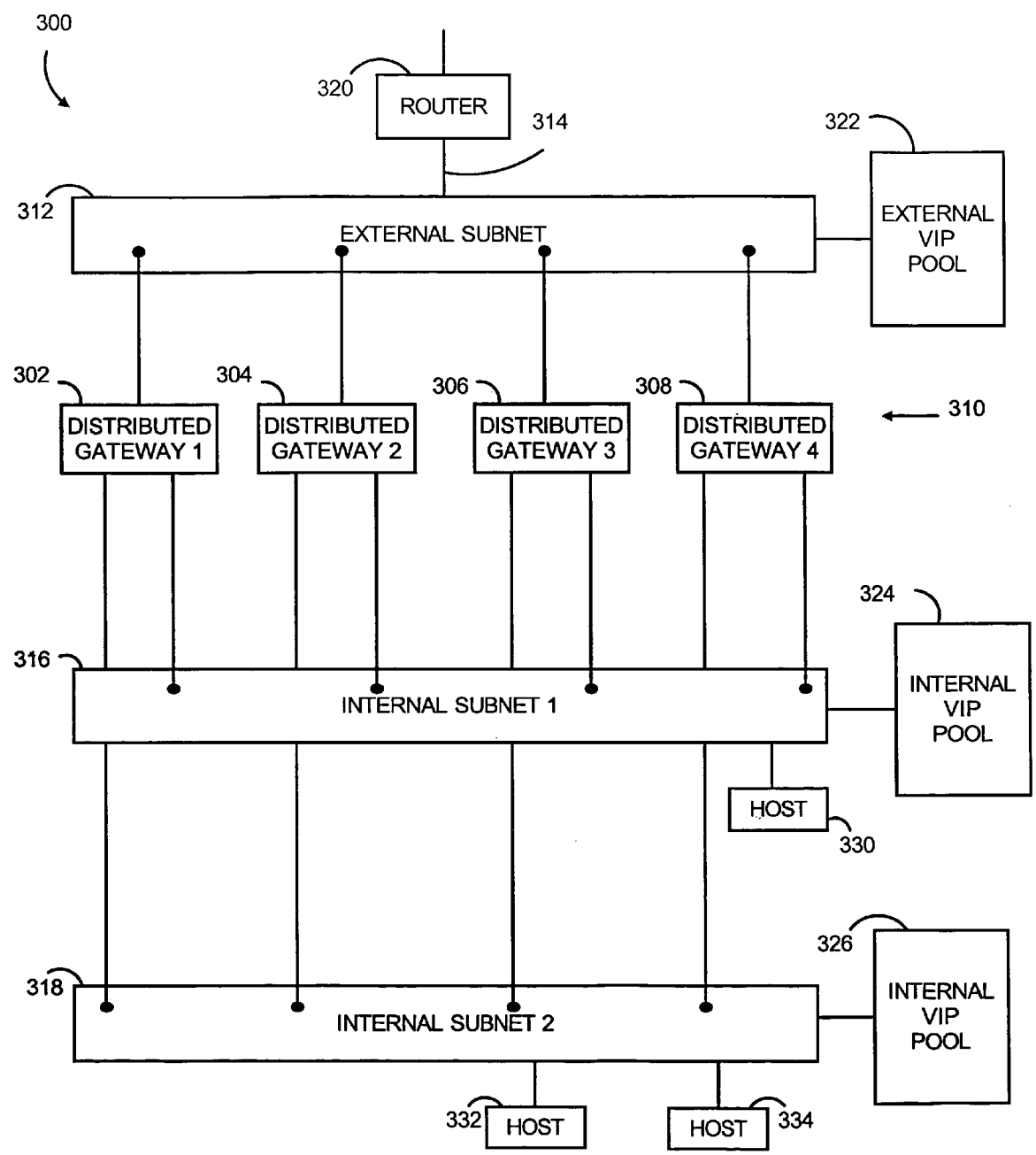
FIG. 3 is a schematic diagram of a computer system constructed in accordance with the present invention.

FIG. 3 is a representation of a computer system 300 constructed in accordance with the present invention. A system constructed in accordance with the present invention is set up to include at least two computers acting as a distributed traffic control center, or gateway, between two networks. The FIG. 3 system 300 includes four machines 302, 304, 306, 308 that act as a distributed gateway 310 between an external subnet 312 interface to the Internet 314 and two internal subnets 316, 318. The four machines control network traffic to and from the internal subnets. The four machines can dynamically reconfigure traffic assignments among themselves and provide increased network availability. For example, if one of the machines 302, 304, 306, 308 becomes unavailable, traffic assignments are moved among the remaining machines such that network availability to host machines on the internal subnets 316, 318 is substantially unchanged. In the illustrated embodiment of FIG. 3, the external network is the Internet, and therefore the data traffic being handled by the gateway 310 follow the TCP/IP protocol model, but it should be understood that other network protocols may be accommodated by a distributed gateway constructed in accordance with the invention, without departing from the teachings of the invention.

As described further below, the machines 302, 304, 306, 308 of the distributed gateway 310 communicate with each other such that dynamic traffic assignment reconfiguration occurs automatically in response to any machine being added or deleted from the gateway 310, with no loss in functionality for the gateway. The reconfiguration process is transparent to local network users, thereby providing a distributed gateway functionality that is scalable. Each machine of the gateway may implement an operational function, such as web server, e-mail server, or encryption services, and can continue with its operational functions while it participates in the distributed gateway and dynamic reconfiguration processing. In this way, the invention substantially maintains network availability regardless of machine failures, so that there is no single point of failure and no lapse in gateway functionality.

Each machine 302, 304, 306, 308 of FIG. 3 is associated with an Internet protocol (IP) address that uniquely identifies the machine and provides an address that is associated with a network interface card (NIC) of the respective machine. This IP address, which is associated with a physical resource such as the NIC, will be referred to as a primary (or physical) IP address, and is an address off of the respective subnet 316, 318. Those skilled in the art will understand that each of the machines includes a NIC interface for each network (internal and external) to which the machine is connected.

In accordance with the invention, the machines 302, 304, 306, 308 provide a distributed gateway by maintaining a set of dynamically assignable IP addresses for each subnet 312, 316, 318. The set of assignable IP addresses for each subnet is called a virtual IP pool. Each subnet 312, 316, 318 in FIG. 3 is identified with a respective virtual IP pool 322, 324, 326. Software that provides the distributed gateway functionality is installed in each of the machines 302, 304, 306, 308. Thus, in FIG. 3, each one of the gateway machines includes three NIC interfaces, for connection of the respective machine to the external subnet 312 and the two internal subnets 316, 318, and each of the machines is associated with a primary IP address and with a virtual IP address for each subnet.

Because of the distributed gateway software installed at each machine, users or host machines on both sides of the gateway 310 will know of and will direct data packets to an address in one of the virtual IP pools, rather than the primary IP address associated with each gateway machine. Thus, a router 320 that directs data traffic to the computers behind the gateway 310 will be aware of only the IP addresses in the virtual IP pool 322 on the external subnet and will not be aware of the primary IP addresses assigned to the NIC cards of each respective gateway machine 302, 304, 306, 308. Similarly, the internal host machines 330, 332, 334 behind the gateway 310 will be aware of only the IP addresses in the virtual IP pools 324, 326 on the respective internal subnets 316, 318 and will not be aware of the primary IP addresses assigned to the NIC cards in the gateway machines for each connection to an internal subnet.

As described more fully below, the dynamic assignment of virtual IP addresses to primary IP addresses permits reconfiguration in response to machine problems and in response to variations in network traffic loading among the machines. If a gateway machine becomes unavailable, then the virtual IP address (or addresses) for which it was responsible are simply assigned to one or more different gateway machines. This capability is referred to as a fail-over capability. A related feature is the scalability of the system, such that the system automatically reconfigures itself dynamically as machines are added or deleted. This also permits more efficient workload distribution among the gateway machines. If a gateway machine becomes heavily burdened with data traffic, one or more of the virtual IP addresses assigned to it will instead be assigned to one or more different gateway machines.

System Software Components

Figure 4:
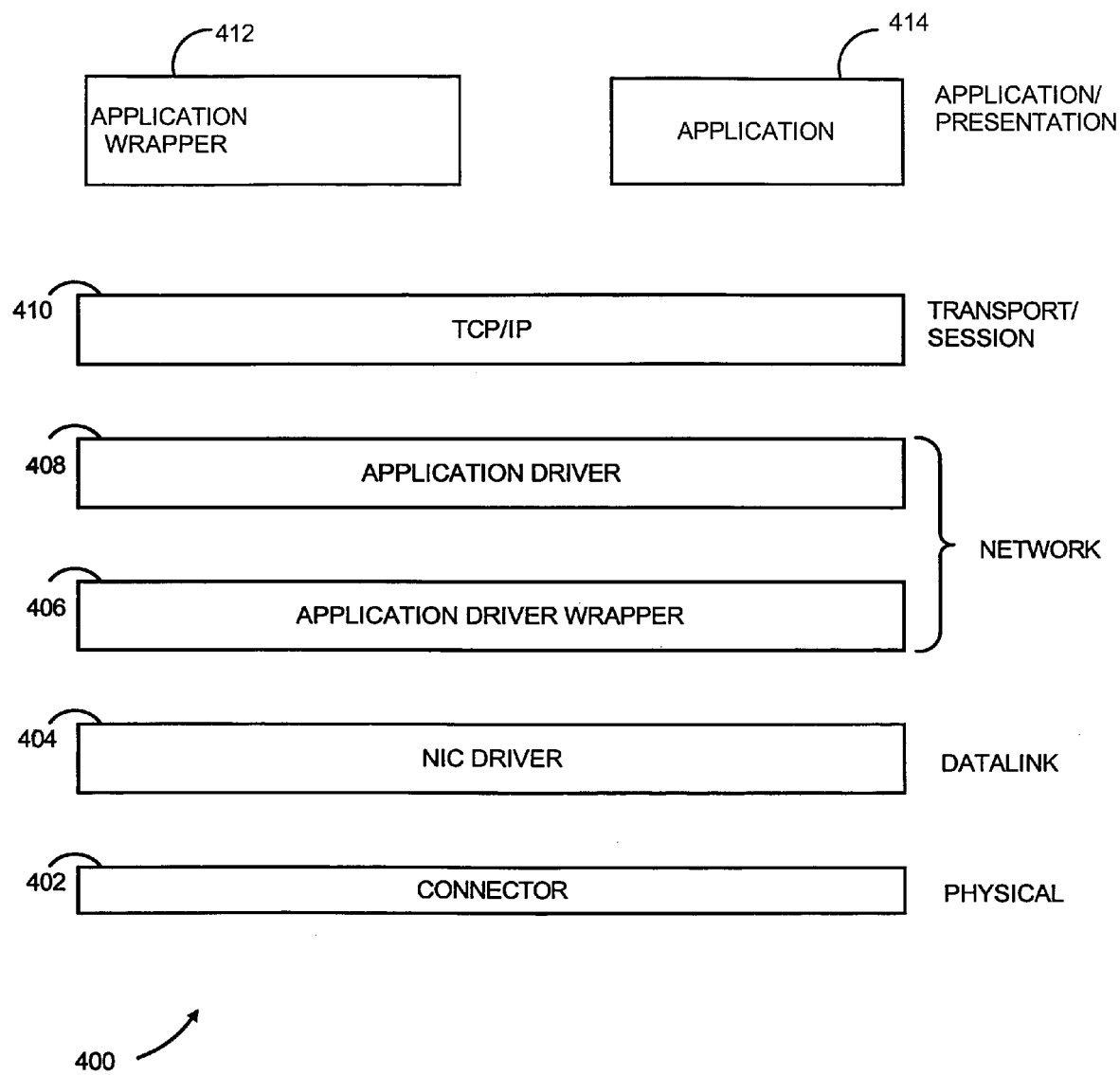
FIG. 4 is a representation of a gateway computer in FIG. 3, illustrating the OSI networking model components of the gateway constructed in accordance with the present invention.

FIG. 4 is a representation of a gateway computer in FIG. 3, illustrating the system architecture 400 of the gateway constructed in accordance with the present invention. Those skilled in the art will understand that FIG. 4 is a system architecture representation in terms of the Open Systems Interconnection (OSI) networking model published by the International Standards Organization.

The lowest level of the system architecture is the Physical layer, Layer 1, where data packets are received at a cable connection 402 from the distributed gateway machine to a subnet, which in the preferred embodiment typically comprises an Ethernet peer-to-peer network. The next OSI level is the Data Link layer, which packages data bits received from the physical layer into data frames that are processed by the higher layers. The Data Link layer is responsible for providing an error-free transmission of data frames between computers through the Physical layer. For example, data packets in the gateway machine are physically received at a network interface card (NIC) of the gateway from a network cable connection. FIG. 4 shows the data link layer function being performed by a NIC Driver 404, which may be a conventional driver program for processing data traffic received in accordance with the Ethernet protocol, or whatever protocol is used for the associated subnet with which the NIC communicates.

The Network layer of the OSI system model is responsible for addressing messages and translating logical addresses into physical addresses. This layer determines which path data will take from a source computer to a destination computer. In FIG. 4, the Network layer is occupied by the Application Wrapper Driver 406 and the Application Driver 408. The Application Wrapper Driver refers to the driver for the application wrapper software that provides the distributed gateway functionality of the present invention. The Application Driver refers to the driver for the application software with which the gateway machine operates. For example, the distributed gateway may be operated in conjunction with firewall software, to provide a distributed firewall gateway. Alternatively, the application software may comprise an e-mail server, in which case the invention provides a distributed mail server with extremely high availability. Other application software may work with the distributed gateway software of the invention to provide the desired gateway functionality.

The next layer in the OSI model is the Transport layer, which in FIG. 4 is represented by the TCP/IP stack 410. The Transport layer repackages messages so as to avoid errors and ensure data is in the proper sequence. The details of this OSI layer in general, and the TCP/IP functioning in particular, will be well understood by those skilled in the art. In the Application/Presentation layer, the distributed gateway of the invention includes the Application Wrapper 412 and the Application 414 software. The Application module 414 refers to software that performs conventional functions, in concert with the distributed functionality of the present invention. For example, the Application module may provide firewall processing, e-mail services, or web page server functionality. As noted above, the Application Wrapper 412 is the software that provides the distributed gateway functionality in accordance with the invention, while the Application is the operational software whose functionality is enhanced, so as to be scalable and distributed, by the Application Wrapper software.

Figure 5:
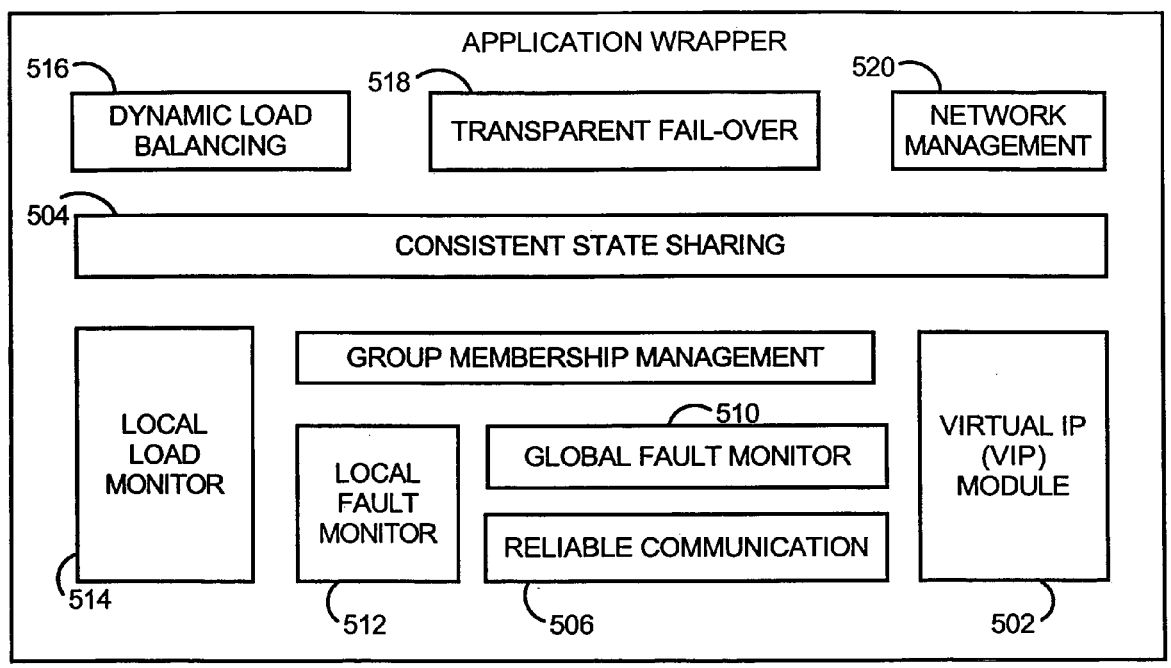
FIG. 5 is a representation of the system architecture for the Application Wrapper illustrated in FIG. 4.

FIG. 5 shows details of the Application Wrapper 410 to better illustrate the architecture of the distributed gateway. One component function of the Application Wrapper is the Virtual IP Address module 502, which maintains the virtual-to-primary IP address mapping between the primary addresses and the virtual IP address pool. Consistent State Sharing 504 is a module that permits the gateway machines to know which machines are functioning and which virtual IP addresses have been assigned to each of the machines. The Reliable Communication 506 component tracks acknowledgment messages communicated around the gateway, and also helps implement Group Membership Management 508, which keeps track of the available machines. Network operations are monitored by the Global Fault Monitor 510, which is complemented by a Local Fault Monitor 512 for the particular machine on which the Application Wrapper is running. A Local Load Monitor 514 determines the data flow rate through the NIC interface in bytes to keep track of machine loading. The Dynamic Load Balancing 516 ensures that no single gateway machine becomes overloaded. It does this by moving virtual IP address assignments, if necessary, in view of the monitored local loads. The Transparent Fail-Over 518 ensures that a failed machine is quickly replaced with an alternative machine, thereby providing high availability in a manner that is transparent to users. These functions operate in conjunction with overall Network Management tasks 520 performed by the gateway software.

Computer Construction

Figure 6:
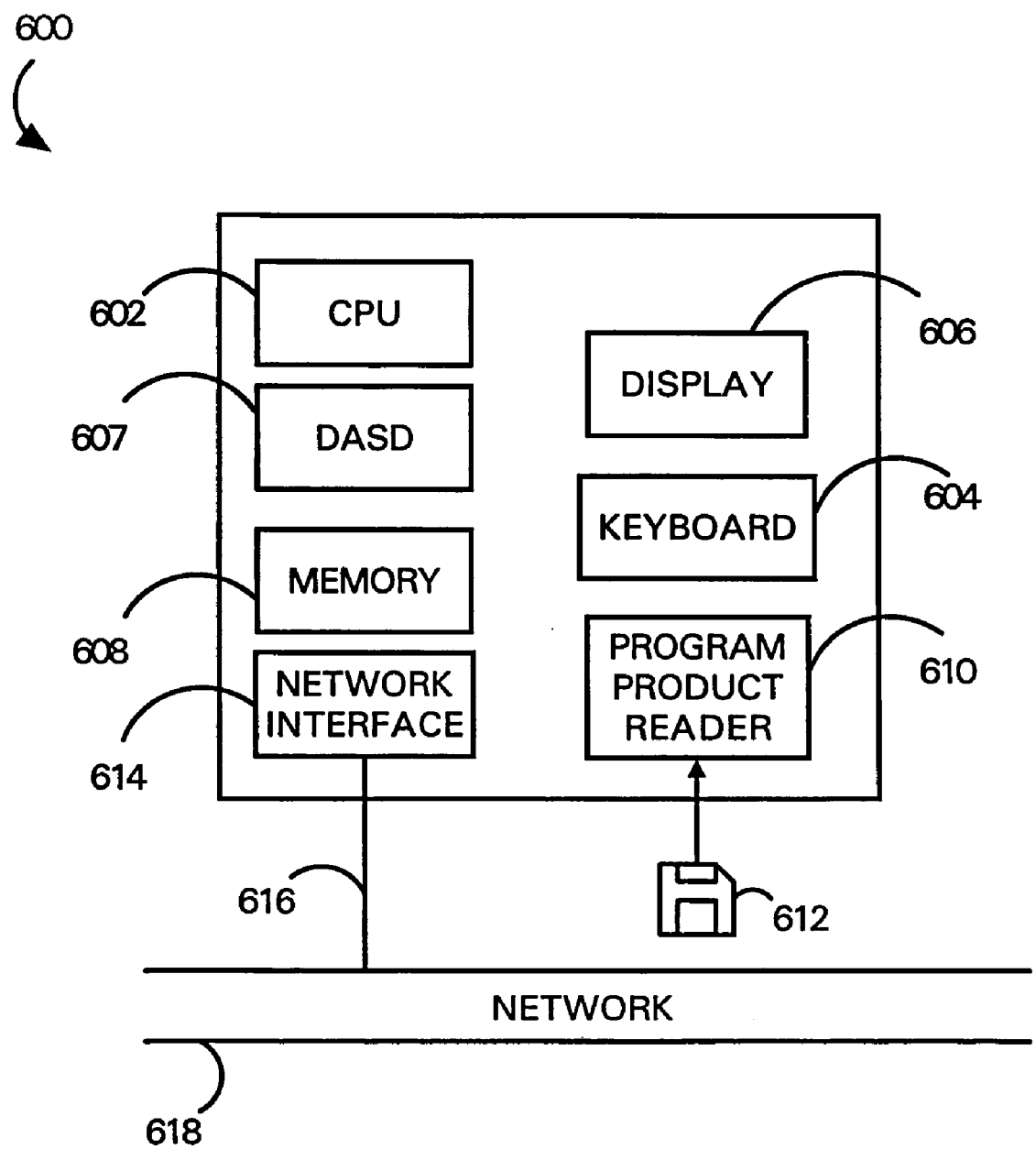
FIG. 6 is a block diagram of a gateway computer in the system of FIG. 3, illustrating the hardware components of the computer.

FIG. 6 is a block diagram of a gateway computer in the system of FIG. 3, illustrating the hardware components for one of the computers. Those skilled in the art will appreciate that the gateway computers 302, 304, 306, 308 and the internal host computers can all have a similar computer construction.

FIG. 6 is a block diagram of an exemplary computer 600 such as might comprise any of the computers 302, 304, 306, 308. Each computer 600 operates under control of a central processor unit (CPU) 502, such as a "Pentium" microprocessor and associated integrated circuit chips, available from Intel Corporation of Santa Clara, Calif., USA. A computer user can input commands and data from a keyboard 504 and can view inputs and computer output at a display 606. The display is typically a video monitor or flat panel display. The computer 600 also includes a direct access storage device (DASD) 607, such as a hard disk drive. The memory 408 typically comprises volatile semiconductor random access memory (RAM). Each computer preferably includes a program product reader 610 that accepts a program product storage device 612, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc. Each computer 600 can communicate with the others over the network through a network interface 614 that enables communication over a connection 616 between the network and the computer. The network interface typically comprises, for example, a Network Interface Card (NIC) that permits communications over a variety of networks. In the gateway 310 (FIG. 3), the network can comprise an Ethernet network or can comprise a connection to the Internet.

The CPU 602 operates under control of programming steps that are temporarily stored in the memory 608 of the computer 600. When the programming steps are executed, the Distributed Gateway machine performs its functions. Thus, the programming steps implement the functionality of the distributed system architecture modules 100 illustrated in FIG. 5. The programming steps can be received from the DASD 607, through the program product storage device 612, or through the network connection 616. The storage drive 610 can receive a program product 612, read programming steps recorded thereon, and transfer the programming steps into the memory 608 for execution by the CPU 602. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 608 over the network 314. In the network method, the computer receives data including program steps into the memory 608 through the network interface 614 after network communication has been established over the network connection 616 by well-known methods that will be understood by those skilled in the art without further explanation. The program steps are then executed by the CPU to implement the processing of the Distributed Gateway system.

It should be understood that all of the computers 302, 304, 306, 308 of the computer system illustrated in FIG. 3 have a construction similar to that shown in FIG. 6, so that details described with respect to the FIG. 6 computer 600 will be understood to apply to all computers of the system 300. Alternatively, any of the computers 302, 304, 306, 308 can have an alternative construction, so long as they can communicate with the other computers and support the functionality described herein.

Group Membership Protocol Word

The fail-over operation, scalability of the system, assignments of virtual IP (VIP) addresses to machines, and the ability to dynamically reconfigure such assignments, are achieved with the distributed gateway software through a Group Membership protocol word that provides state sharing information among all the machines in a cluster. The state-sharing protocol word is passed around the cluster machines who are members of the same subnet in a token ring arrangement that will be familiar to those skilled in the art.

Figure 7:
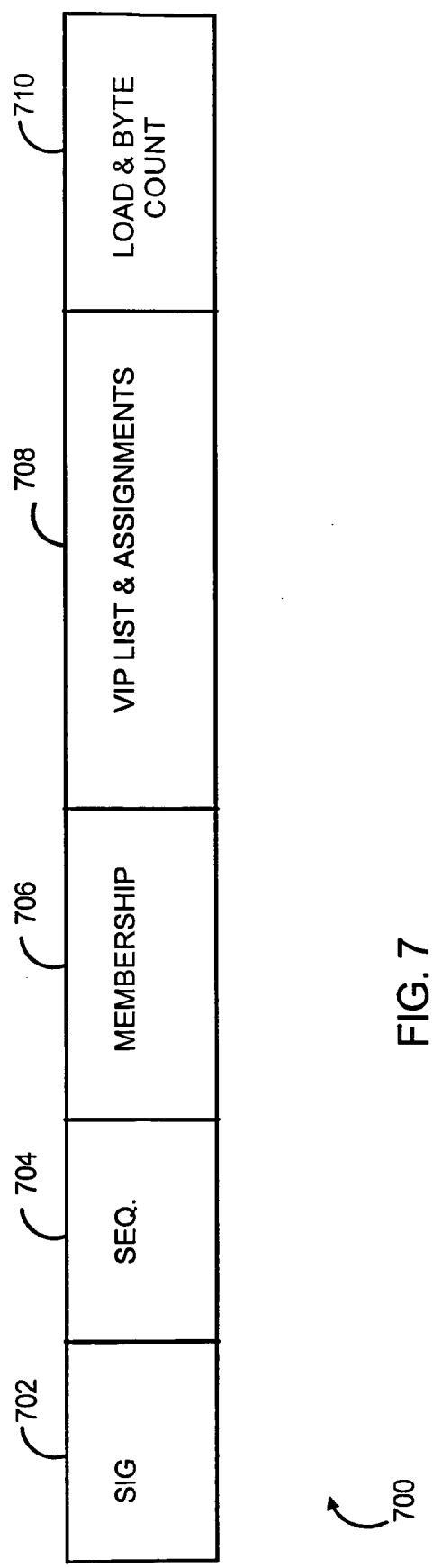
FIG. 7 is a representation of the Group Membership protocol word used by the distributed gateway computer of FIG. 4 in communicating status information in the computer system of the invention.

FIG. 7 is a representation of the Group Membership state protocol word 700 that is used by the cluster computers of FIG. 6 in communicating the state information among the machines of the distributed gateway. The state protocol word 700 includes a Signal Type (SIG) field 702 that indicates whether the word is a token message for normal operating conditions or is a notification message (also called a "911" message). The next field is a Sequence (SEQ.) field 704 that is incremented by each node as the message makes its way around the nodes of the cluster. The next field is a Membership field 706 that indicates the group composition of the cluster, followed by a VIP list and assignments field 708 (Group Composition) to reflect cluster configuration data, and finally there is an Operational Data field containing load and byte count data 710 that indicates the data flow rate through a node. In particular, the data flow rate is indicated by information retrieved from the NIC of the node. Each received Group Membership message, whether it is a normal token message or a "911" message, is parsed by the distributed gateway software of each particular cluster machine to extract the necessary data.

The Sequence number field 704 is incremented by each node when it receives a message (a token message or 911 message). An initial random sequence number is selected as a default start value, and when the sequence numbering reaches a predetermined limit value, the sequence numbering wraps around and begins at the start value. When a node puts a message on the subnet, the node increments the sequence number that was contained in the received token, places the incremented token back out on the subnet, and stores the incremented number in memory. Thus, any message produced by a node will have a unique sequence number. A node should not receive a token message with a sequence number lower than the sequence number stored in its memory.

The Membership field 706 in a token message is a collection of sub-fields to indicate group composition. In particular, the Membership field of the preferred embodiment contains data that provides the number of nodes in the cluster, a list of the nodes, the current node sending the token message, and the destination node (the next node in the cluster, the node to whom the message is being sent). Each node changes the appropriate membership field values when the node receives the token, and in this way ensures that the token is passed along the machines in the cluster, from node to node in proper sequence.

For example, the "number of nodes" field in a token message might indicate a cluster having four nodes, such as illustrated in FIG. 3. The token message might indicate subnet addresses of (1.1.1.1), (1.1.1.2), (1.1.1.3), and (1.1.1.4) in the "list of nodes" data of the Membership field 706. If the nodes are numbered, from first to last, as −1, −2, −3, and −4, and if, at a particular point in time, the token is being sent from the second node (node −2) and is received at the third node (−3), then the "current node" value is "2" (the second node in the cluster) and the "destination node" value is "3" (the third node). After the third node (−3) receives the token, the third node changes the "current node" to "3", changes the destination node to "4", and sends the token back out on the subnet to the next node. In this way, each node always knows whether it is the intended recipient of a token message.

The Membership field 706 in a "911" message includes two sub-fields comprising an originating node address and a permission flag. A "911" message is sent by a node (the "originating node") when that node determines that the token message might have been lost somewhere in the cluster, and therefore might need to be regenerated. This may occur, for example, if another node fails when it has possession of the token message for processing. In that case, the originating node needs to determine if it has the latest copy of the token to regenerate the token. This determination is made with the help of the "911" message.

As a "911" message is sent around the machines of a distributed gateway cluster, the permission flag value in the message is set to TRUE by each node when it receives the "911" message, unless a receiving node has a higher sequence number stored in its memory for the last token message it sent out. If the receiving node has a higher sequence number, then it sets the permission flag to FALSE before putting the "911" message back out on the subnet. When the originating node receives back the "911" message, it will examine the message to determine if the permission flag sub-field contains TRUE or FALSE. If the permission flag is FALSE, then the originating node will not regenerate the token message it has in memory. That is, when the "911" message received by the originating node says FALSE, that means another node has already sent out a more recent token, with a higher sequence number. Therefore, the originating node will wait for the next token message (having a higher sequence number), and will adopt the system values (VIP list, membership, etc.) that are indicated in that token. If the originating node receives a "911" message back with TRUE, then the originating node knows it has the most recent token, so it will re-send the last token message it has, with all its system values (VIP list, membership, etc.). The unique sequence number ensures that only one node, the one with the most recent token message, will change the permission flag to TRUE.

The Group Composition field 708 of the Group Membership protocol word 700 contains a list of virtual IP addresses (VIP list) and of corresponding node assignments for those addresses. The Group Composition field contains sub-fields of data that specify the VIP address, the primary IP address to which that VIP address is currently assigned, an indication for each VIP address whether there is a preference for assignment to that address, and a persistence or "sticky" flag to indicate whether the preference is sticky. A sticky VIP address assignment means that the VIP address will be forced to an assignment to that particular node, so that all traffic for that VIP address must be directed to that node, unless the machine is unavailable. Thus, a sticky assignment in the Membership field means that all data traffic for that node will be directed to that node, if the node is available. If the node fails, traffic will be re-routed. If the node comes back up, then the data traffic intended for the node will again be directed to that node. A persistence flag set to a non-zero value indicates that a user has indicated a preference for assigning that VIP address to the node involved.

For example, if there are four addresses in the VIP list, then the information in the Group Composition field 708 might be summarized in Table 1 below:

TABLE 1

| VIP Address | Current Host | Preferred Host | Persistence Flag |
|---|---|---|---|
| 1.1.1.1 | 1.1.1.5 | 1.1.1.6 | 0 |
| 1.1.1.2 | 1.1.1.5 | 1.1.1.5 | 1 |
| 1.1.1.3 | 1.1.1.6 | 0.0.0.0 | 0 |
| 1.1.1.4 | 1.1.1.6 | 1.1.1.6 | 3 |

As Table 1 shows, the Group Composition field 708 contains four sub-fields: VIP address, Current Host, Preferred Host, and Persistence Flag. Each of the first three fields holds the value of an IP address. The last field is an integer. In the preferred embodiment, data in the Group Composition field 708 will be placed in sequence, so that data for the first row of Table 1 is listed in the Group Composition field, followed by data for the second row, and so forth. Other schemes for packing the Group Composition field may be used.

In the Group Composition data, there is one VIP address sub-field, providing a VIP list for the entire cluster. The first sub-field, VIP address, lists the VIP addresses for the entire distributed gateway cluster. The second sub-field, Current Host, specifies which node currently owns this particular VIP address. The primary IP address of that node is used in the Current Host value. For example, according to Table 1, node (1.1.1.5) owns, or is assigned, VIP addresses (1.1.1.1) and (1.1.1.2). The third sub-field, Preferred Host, indicates the node at which this VIP prefers to be hosted. For example, to move VIP address (1.1.1.1) from Node (1.1.1.5) to Node (1.1.1.6), it would be necessary to specify Current Host as (1.1.1.5), and Preferred Host as (1.1.1.6). The VIP address assignments indicated by the Current Host and Preferred Host data sub-fields can be changed by a user during real-time operation of the distributed gateway application through a user interface, which is described in greater detail below.

The last sub-field of the Group Composition data is the Persistence Flag. It indicates whether the associated VIP address is "sticky" to the Preferred Host. When a VIP address is "sticky" to an assigned node (the one it is associated with in the same row of Table 1), it is no longer handled by the load balancing process of the distributed gateway application wrapper. The Persistence Flag field can take three possible integer values: "0", "1" and "3". When it is "0", it means that the associated VIP address is not sticky to any node. This VIP address can be moved, if so required by the load balancing process. When the Persistence Flag is "1", it means this VIP address is sticky to the Current Host specified in the same row of Table 1, and therefore it is not handled by the load balancing process. If the Current Host fails, this VIP address assignment will move to another node of the subnet, and will become sticky to that node. It will stay on that node even if the original Host recovers. When the Persistence Flag is "3", it means this VIP address is sticky to the Preferred Host.

Whenever the Preferred Host is functioning (alive), the VIP address will move to the Preferred Host node and stay with it (becomes "sticky" to it). When the Preferred Host fails, it fails over to another node of the subnet. The VIP address will move back to the Preferred Host when the Preferred Host recovers. It should be noted that regardless of which value the Persistence Flag takes, when the Current Host fails, the associated VIP address will always fail over to a healthy (alive) node. As described further below, the "sticky" feature of a VIP address assignment can be changed by a user in real time through a system interface.

Returning to FIG. 7, the last data field of the protocol word 700 is the load and byte count data field 710. This data field indicates the traffic flow of message packets through each of the distributed gateway machines of the cluster subnet. In the preferred embodiment, the data comprises a byte count of data through the network interface card that connects each distributed gateway machine to the subnet. As with the group composition field 708, the byte count field 710 is organized in the protocol word such that the data for the first node occurs first, then the second node, then the byte count data for the third node, and so forth for each of the machines in the cluster who are connected to the pertinent subnet.

In accordance with the invention, the protocol word 700 is circulated around the subnet from machine to machine, in sequence. Each machine receives a protocol word as part of the group membership message that is passed from machine to machine approximately at a rate of once every 100 milliseconds. Other message passing rates may be used, depending on the network configuration and machine operation.

Machine Operation

Figure 8:
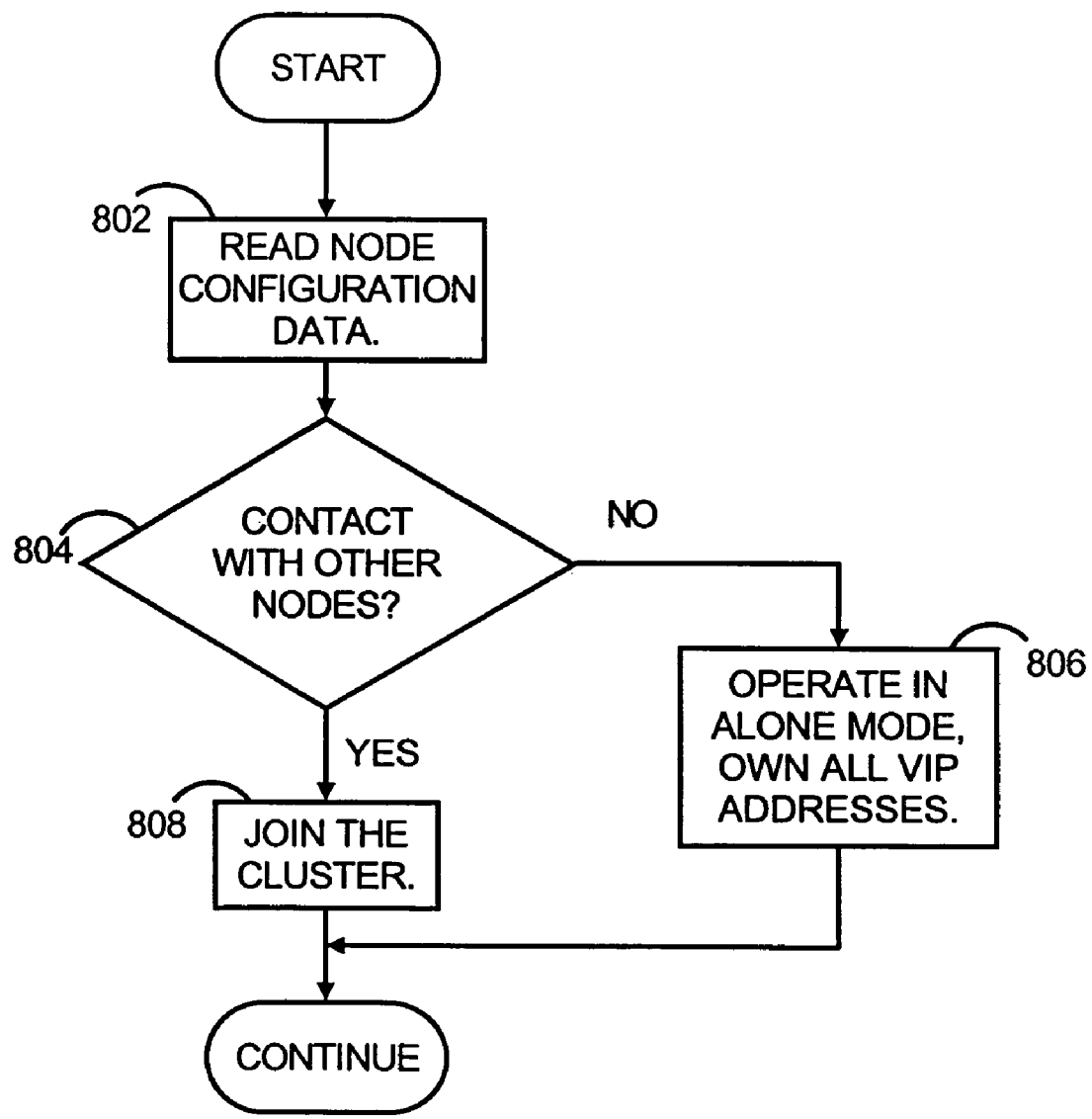
FIG. 8 is a flow diagram of the operating steps executed by a distributed gateway computer of FIG. 3 in starting up and processing group membership messages on a subnet of the system.

FIG. 8 is a flow diagram of the operating steps executed by a distributed gateway computer of FIG. 3 in starting up and processing group membership messages on a subnet of the system. This processing is executed by the computer from its program memory once the appropriate distributed gateway application software is loaded onto the computer and the setup operation (described below) has been completed.

In the first processing step performed by the starting computer, represented by the flow diagram box numbered 802, the configuration data of the machine is read from the direct access storage device, such as the hard disk of the computer. The configuration data includes a number of stored configuration files, including a node map, the virtual IP addresses of the cluster, cluster configuration options, local fault monitoring specifications for the machine, and a license key or password. The node map contains the primary IP addresses of all the nodes in the cluster, in an arbitrary ordering around the subnet that is determined by the user during the setup process. The configuration files specify the "initial" cluster setup. Users can change these settings at runtime with the user interface described below. Such runtime changes will not affect the configuration files, though a user may manually edit them with a text editor.

From the node map of the configuration data, the computer that is starting up knows whether it has companion machines in the subnet cluster, and it knows how many additional machines to expect in the cluster. Therefore, the starting computer next will attempt to contact all of the other machines on the subnet and determine if it is the first executing machine in the cluster. This process is represented by the decision box numbered 804.

The process of a starting computer to determine if it is the first operational node involves first sending a unicast UDP (User Datagram Protocol) packet message. The UDP message implements a conventional connectionless protocol message that provides a means of sending and receiving datagrams over a network. Those skilled in the art will be familiar with the use of UDP packet messages. The UDP message sent by a starting computer includes a Group Membership protocol word, as described above in conjunction with the description of FIG. 7.

If the starting computer is actually attempting to recover or regenerate a token, and is not involved in an initial start sequence, then it could use the UDP message to send a "911" or notification message, as described above. When the computer rejoins the cluster, it will use the current cluster setup information in a token message for the cluster properties. If the starting computer is actually starting up from a cold start, then the UDP message will comprise a token message, such as that described above, that includes all the node data and configuration information that the starting computer retrieved from its configuration files. In either case, the computer that sends out the message waits for a reply.

If the starting computer receives no replies to the message for all other nodes in the configuration, then it knows it must be the first node in the cluster. This corresponds to an affirmative (YES) outcome at the decision box numbered 804. If the starting computer is the first cluster computer, then it assumes responsibility for all the VIP addresses in the cluster. Thus, it will set the data fields in the Group Membership protocol word accordingly, and continue data traffic handling operation while it waits for the other machines of the cluster to join. In accordance with operation of the cluster machines of the invention, the starting computer will send out a gratuitous ARP (Address Resolution Protocol) message for each VIP address that it takes. This mode of operation is referred to as "alone mode", and is indicated by the FIG. 8 flow diagram box numbered 806.

Those skilled in the art will be familiar with the conventional ARP scheme for translating logical IP addresses into physical network interface addresses in conjunction with stored address resolution information. More particularly, the network interface addresses are also known as Media Access Control (MAC) addresses for network cards. The ARP message is a conventional means of storing logical to physical address data in the machines connected to a network, such as each of the subnets connected to the starting computer. Thus, for each subnet to which it is connected, the starting computer will determine if it is the first node and, if it is, the starting computer will send out a gratuitous ARP message for the VIP addresses that it is taking.

If the starting computer receives a reply to the UDP message, then it knows other machines are active in the cluster, and it will attempt to join the cluster. This corresponds to the "join cluster" processing of box 808, following the negative outcome (NO) of the decision box 804. Any node that is already active and has received the UDP message from the starting computer will accept the starting computer into the operating cluster, in the following manner.

As noted above, a starting computer will send a 911 message with a Group Membership protocol word over the subnet with the data it has retrieved from its configuration files. When the operating node receives the 911 message from the starting computer, the operating node processes the node list in the message and adds the starting node into the list, as appropriate. Thus, permanent connections specified by initial data may indicate a particular VIP address assignment, or predetermined default assignments may be used. In either case, the operating node adds the new node into the node list data and then puts the processed Group Membership token back out onto the subnet. When the starting computer receives back the Group Membership token, it will process the node assignment data to reflect the presence of the operating node, and it thereby becomes part of the cluster. The starting computer will then pass the Group Membership token along, back out onto the subnet, in its normal operation.

Figure 9:
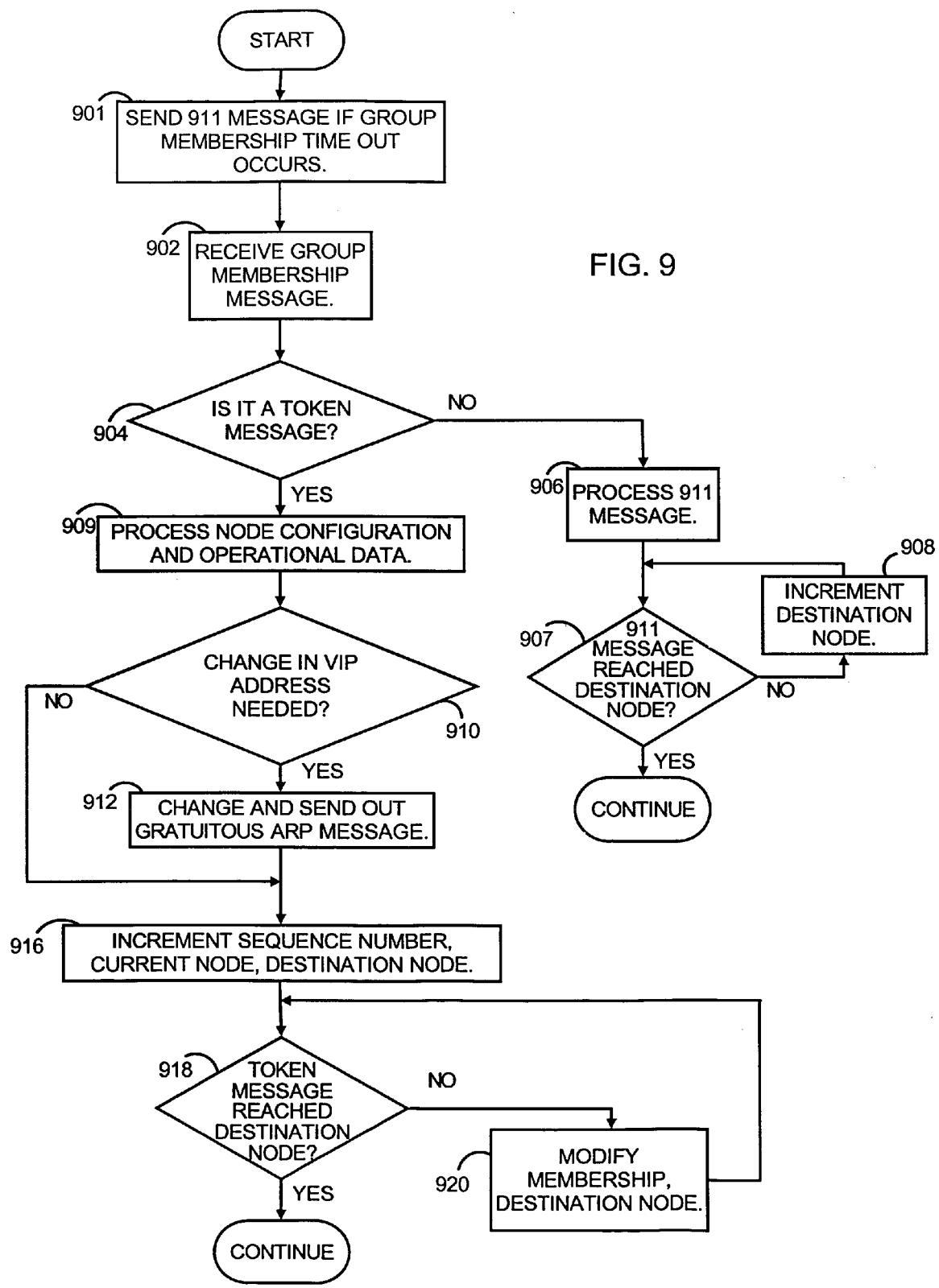
FIG. 9 is a flow diagram that shows details of the group membership message processing performed by each of the distributed gateway computers of FIG. 3.

FIG. 9 is a flow diagram that illustrates the Group Membership message processing performed by each of the distributed gateway computers of FIG. 3 during normal operation, as a node in a cluster. In general, for the distributed gateway application software, a token acts as a failure detector. Therefore, if a token does not reach the specified destination node from a current node, the current node will assume the destination node is down. As a result of not receiving an acknowledgment, the current node will modify the group membership information on the token accordingly, and will send the token to the next node in the subnet cluster, past the previous destination node. In contrast to the token processing described above, a "911" message will not modify the membership on the token when the destination cannot be reached. It will simply increment the destination node, and send to the next node in the subnet ring. This processing is illustrated in FIG. 9, as explained further below.

First of all, if a node has not received a Group Membership message from another node for greater than a time-out interval, then the node will send out a "911" notification Group Membership message, as was described above in conjunction with FIG. 7. This processing is represented by the flow diagram box numbered 901. In the next step of normal message processing, represented by the FIG. 9 flow diagram box numbered 902, the node receives a Group Membership message. The node next determines whether the message is a token message or a "911" notification message, by examining the signal type message field described above in conjunction with FIG. 7. If the message is not a token message, then it is a "911" message, a negative outcome at the decision box numbered 904. As indicated by the flow diagram box numbered 906, the node will process the "911" message to examine the sequence number, determine if the sequence number it has is greater than the received sequence number, and process the permission flag. The node may determine that the "911" message is one that it sent, in which case it may need to regenerate the last token message it sent (if permission="TRUE"). In that case, it will regenerate the token, and put the message token back out onto the subnet. If it did not send the "911" message, then the node will determine if it has a sequence number greater than that in the message. If it has a higher sequence number, it will set the permission flag (FALSE) accordingly, and send the message back out onto the subnet. If the node does not have a higher sequence number, it does not change the permission flag setting, and the sends the message onto the subnet to the next node.

Whether or not the originating node changes the permission flag, it waits for an acknowledgment from the next node (the destination node) after sending the "911" message back out onto the subnet. This is represented by the decision box numbered 907. If the originating node receives a response, an affirmative outcome at the decision box numbered 907, it continues with normal processing. If the originating node does not receive an acknowledgment response within the timeout interval, a negative outcome at the decision box 907, then the originating node increments the destination node in the "911" message to skip the non-responsive node on the subnet, and sends out that modified "911" message. This processing is represented by the flow diagram box numbered 908. The originating node then waits for that new destination node to respond, in accordance with the decision box 907.

Token failure detection generally assumes that failure to receive an acknowledgment within a predetermined time interval indicates that a message never reached the destination node, and therefore assumes that the destination node is down. Such failure detection is not totally reliable, however, as a failure to respond within the time interval may simply indicate a slow node. Thus, in an asynchronous network environment, a reliable failure detector is virtually impossible to build, since one cannot tell a "dead" or down node from a "very slow" node. Under operations of the distributed gateway application software, however, if a "slow node" is mistaken for a "dead node" and is deleted from the list of active nodes, then the slow node will rejoin the cluster automatically. This is accomplished because of the following sequence of events: When a slow node is waiting for the token to arrive, its timeout interval will expire. That node will then send out a "911" message, thinking that the prior node is down. The "911" message will be regarded by the other nodes as an add request to join the cluster, and that slow node will effectively be added back into the distributed gateway cluster.

If the received Group Membership message is a token message, an affirmative outcome at the decision box 904, then the node processes the information contained in the message. This processing is represented by the flow diagram box numbered 909. Thus, changes in VIP address assignments may be received, or changes in such assignments may need to be implemented, in response to load information in the operational data. At the decision box numbered 910, the node may determine that a change in VIP address assignment is needed. The node may make this determination, for example, if the load level it is experiencing, or if the load level it sees another node experiencing, exceeds a predetermined byte rate load level limit.

Thus, individual nodes in a cluster may observe the configuration and operational data in a token message and recognize that another node in the cluster is receiving a sufficiently great amount of data traffic, due to its VIP address assignments, that the performance of the cluster as a group could be improved if the load of the other node is reduced. If that is the case, then the message processing node that has received the token message and has observed the need for reassignment will proceed with a VIP address reassignment in which the processing node will reassign one or more VIP addresses from the overloaded node to itself, or even reassign VIP addresses from itself to another node. For example, each processing node that recognizes an overloaded condition may take one additional VIP address assignment. If the next node that receives the token message sees that the overloaded condition still exists, it will take another VIP address assignment for itself. In this way, dynamic load balancing will occur during real time operation of the cluster.

If the processing node determines that a reassignment of VIP addresses is needed, an affirmative outcome at the decision box 910, then the node will implement whatever reassignment its processing dictates by changing the VIP address data in the Group Composition field 708 (FIG. 7) of the token message. Whenever there is a new or changed VIP address assignment, the node making the change sends out the ARP message mentioned above in connection with startup processing. Unlike the startup processing, however, this ARP message occurs during normal processing, and is prompted not by startup processing but by the desire to change assignments and inform the other nodes. The message is therefore referred to as a "gratuitous" ARP message. This processing is represented by the flow diagram box numbered 912. Those skilled in the art will understand that each machine connected to a subnet includes an ARP cache that contains data to translate logical IP addresses into physical MAC addresses, and will further understand that an ARP message is a message that is sent out over a network and is automatically processed by any computer communicating with that network to store the ARP message information into the ARP cache of the computer. The clients and routers on the subnet will receive the ARP message and will then automatically refresh their respective ARP caches with the new assignment information. All such processing is incorporated into the processing of the flow diagram box numbered 912.

After the token message is processed, with or without VIP address changes, the node increments the sequence number and changes the current node and destination node data fields of the message, as described above with respect to FIG. 7. The node then sends the token message back out on the subnet to the next node. This processing is represented by the flow diagram box numbered 916.

After the originating node sends the token message onto the subnet, it waits for an acknowledgment from the destination node. If the originating node receives a response, an affirmative outcome at the decision box numbered 918, it continues with normal processing. If the originating node does not receive an acknowledgment response within the timeout interval, a negative outcome at the decision box, then the originating node modifies the active membership list for the cluster to delete the non-responsive node, then increments the destination node number on the subnet to skip the non-responsive node, and sends out that modified token message onto the subnet. This processing is represented by the flow diagram box numbered 920. The originating node then waits for that new destination node to respond, in accordance with the decision box 918.

Graphical User Interface

The software to implement the distributed gateway processing described above (the Application Wrapper module of FIG. 4) is installed into program memory of a computer that is to become part of a distributed gateway cluster in accordance with the invention. In the preferred embodiment, the software provides a graphical user interface (GUI) in both the program setup mode and in the program operational mode. Thus, a user will be shown GUI display screens to guide the user through setup and operation. Those skilled in the art will be familiar with GUI display screens and the manner in which they are created, displayed, and manipulated by users.

Figure 10:
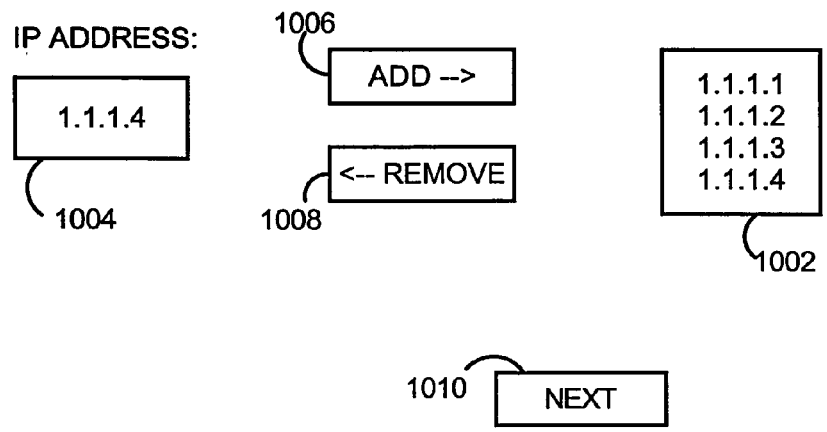
FIG. 10 is a representation of a GUI setup screen as shown on the display device of the FIG. 6 computer, in accordance with the present invention, for setting up primary IP addresses.

FIG. 10 is a representation of a GUI setup screen 1000 as shown on the display device of the FIG. 6 computer, in accordance with the present invention, for setting up primary IP addresses of the distributed gateway cluster. The setup screen of FIG. 10 appears on the user computer display as a window when the setup program of the Application Wrapper (FIG. 4) is launched. As FIG. 10 indicates, the setup program of the distributed gateway first asks the user to set up the internal IP addresses (the primary IP pool) for each computer that will be a part of the distributed gateway cluster. In the exemplary data of FIG. 10, the cluster has four IP addresses, represented by (1.1.1.1), (1.1.1.2), (1.1.1.3), and (1.1.1.4). These IP addresses are entered into an IP address list box 1002 one by one after the user enters them into a text box 1004. The IP addresses can be added and deleted by using the Add 1006 and Remove 1008 buttons of the setup window. When the numbers in the primary IP address pool have been entered, the user is ready for the next setup window, to which the user proceeds by selecting the Next button 1010.

Figure 11:
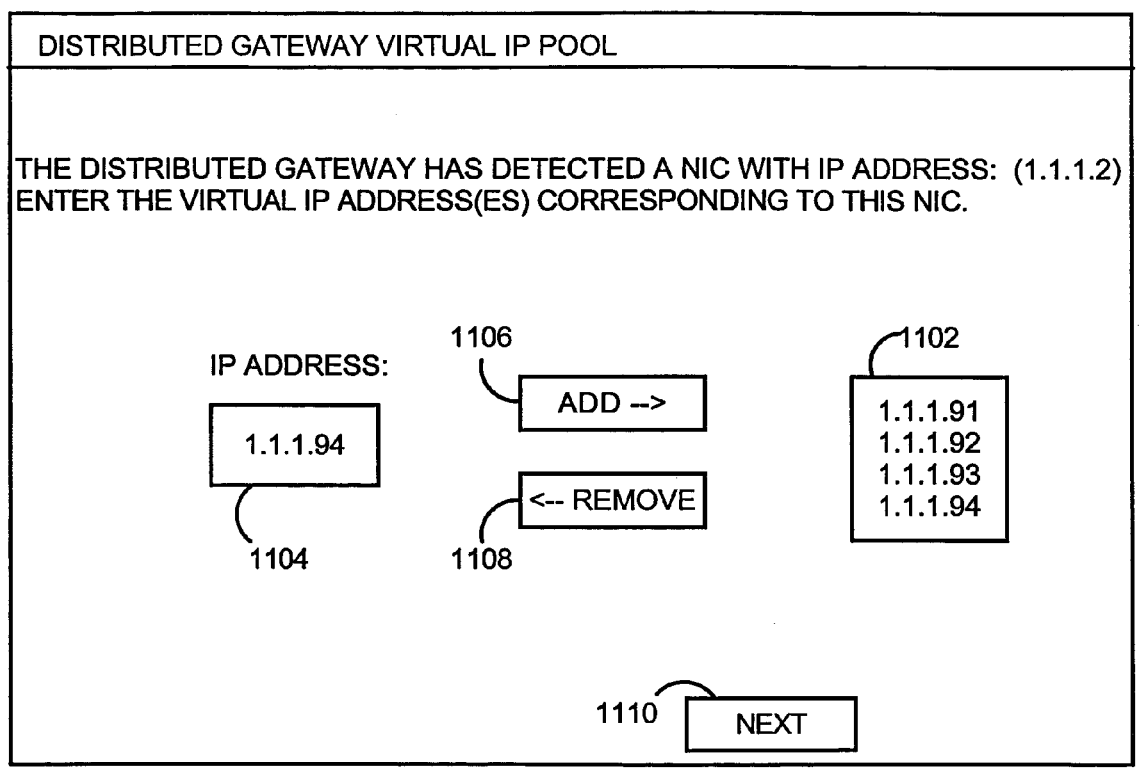
FIG. 11 is a representation of a GUI setup screen as shown on the display device of the FIG. 6 computer, in accordance with the present invention, for setting up virtual IP addresses.

FIG. 11 is a representation of a GUI setup screen 1100 as shown on the display device of the FIG. 6 computer, in accordance with the present invention, for setting up virtual IP addresses. After the addresses of the primary IP address pool have been set, the setup program must next process the virtual IP address pool. When the user selects the Next button 1010 from FIG. 10, the distributed gateway program initiates a system check for network interface (NIC) cards. In the example of FIG. 11, the program has displayed a message in the virtual IP (VIP) address setup window 1100 that indicates finding a NIC with an IP address of (1.1.1.2). It should be understood that the system check will find each NIC that is installed into the node computer, and that FIG. 11 simply illustrates one of the display windows that will be shown during the entire setup process.

The FIG. 11 display window 1100 indicates that the user should now enter the virtual IP address pool of addresses that will be associated with the NIC that has a primary IP address of (1.1.1.2). As indicated in the virtual IP address list box 1102, the subnet virtual IP addresses for this NIC will be (1.1.1.91), (1.1.1.92), (1.1.1.93), and (1.1.1.94). These addresses will be entered by the user with the virtual IP address text box 1104 and the Add button 1106 and Remove button 1108. The user must enter the virtual IP addresses for each machine being configured. It should be apparent that the list of virtual IP addresses should be the same for each machine on the subnet. It also should be clear that each subnet will have a set of virtual IP addresses entered for it, for both the external subnet(s) and the internal subnet(s).

After the setup procedure has been completed, the user must input the configuration parameters for the cluster. Configuring the distributed gateway cluster in accordance with the invention involves modifying the configuration files first described above. In a conventional window programming environment, for example, these files include a node map configuration called "nodemap.cfg" that will list the primary IP addresses for the gateway machines. Another configuration file is "vip.cfg", which determines the virtual IP addresses in the VIP address pool for each subnet connected to the cluster. These configuration files contain configuration data in a text format, in which the IP addresses are simply listed, for example. The distributed gateway application will know the nature of the data contained in each configuration file because the file names are predetermined. For example, a standard windowing operating system (such as "Windows NT" by Microsoft Corporation of Redmond, Wash., USA) will process a file name with a ".cfg" suffix as a text file, containing characters of a standard ASCII alphanumeric set. The configuration file contents may be easily edited by the user, using a command line editor utility of the distributed gateway or other suitable utility.

For example, the "vip.cfg" file may contain the text data shown below in Table 2:

TABLE 2

| virtual IP Pool | |
|---|---|
| VIRTUAL_IP | 131.143.36.0 { |
| | 131.143.36.91 |
| | 131.143.36.91 |
| | 131.143.36.91 |
| | 131.143.36.91 |
| } | |

In addition to the node map and the VIP address list, optional configuration files include the local monitor configuration file "localmonitor.cfg", which is used for specifying fault detection behavior of the machine. As described more fully below, the monitor functions that can be specified includes parameters for triggering monitoring of local NIC's, monitoring of the application (firewall), and monitoring of the remote hosts/router combination via the "Ping" protocol.

The NIC monitoring function tests the network interface cards in the local machine to determine if the cards are still functioning properly. The system can set this parameter to a default value. Details of the testing for NIC functionality will depend on the NIC being used, and will be understood by those skilled in the art.

Monitoring of the remote hosts/router involves testing the application (in the preferred embodiment, a firewall) for proper operation. In the case of a firewall application, the testing would involve generating "dummy" packets and checking to see if the firewall rejects or accepts such packets, based on the rules required by the firewall application. That is, the distributed gateway software (the Application Wrapper of FIG. 4) would interface with the Application (FIG. 4) to periodically generate predetermined dummy packets of a type that should be accepted by the firewall Application, and that should be rejected by the firewall. The distributed gateway software would then report the results as part of the GUI, as described further below.

Details of interfacing the distributed gateway software with the firewall software will depend on the firewall software being used. Those skilled in the art will understand how to implement such an interface, in accordance with the description herein. To properly interface the two applications, the default gateway of hosts or routers external to the distributed gateway should be set to one of the IP addresses from the external virtual IP address pool for the subnet of that host or router, and the default gateway of hosts or routers internal to the distributed gateway should be set to one of the IP addresses from the internal virtual IP address pool for the subnet of that host or router.

The use of the "Ping" function to monitor the remote host/router will be apparent to those skilled in the art, where the distributed gateway software will assume that a remote host/router is not functioning properly if it does not respond to a conventional "Ping" message within a predetermined time interval. In accordance with the invention, the Ping function may be activated and deactivated by setting a parameter in the "localmonitor.cfg" file, such as by inserting an "enableMonitor( )" entry into the text file and inserting an IP address to be pinged by using an entry of the form "addMachine(IP address)". The function may be deactivated by including a "disableMonitor( ) entry into the text file.

By editing the configuration file, a user may directly set and modify operating parameters of the distributed gateway. Alternatively, the distributed gateway software may permit changing one or more of the parameters through the GUI display screens, as described further below.

Figure 12:
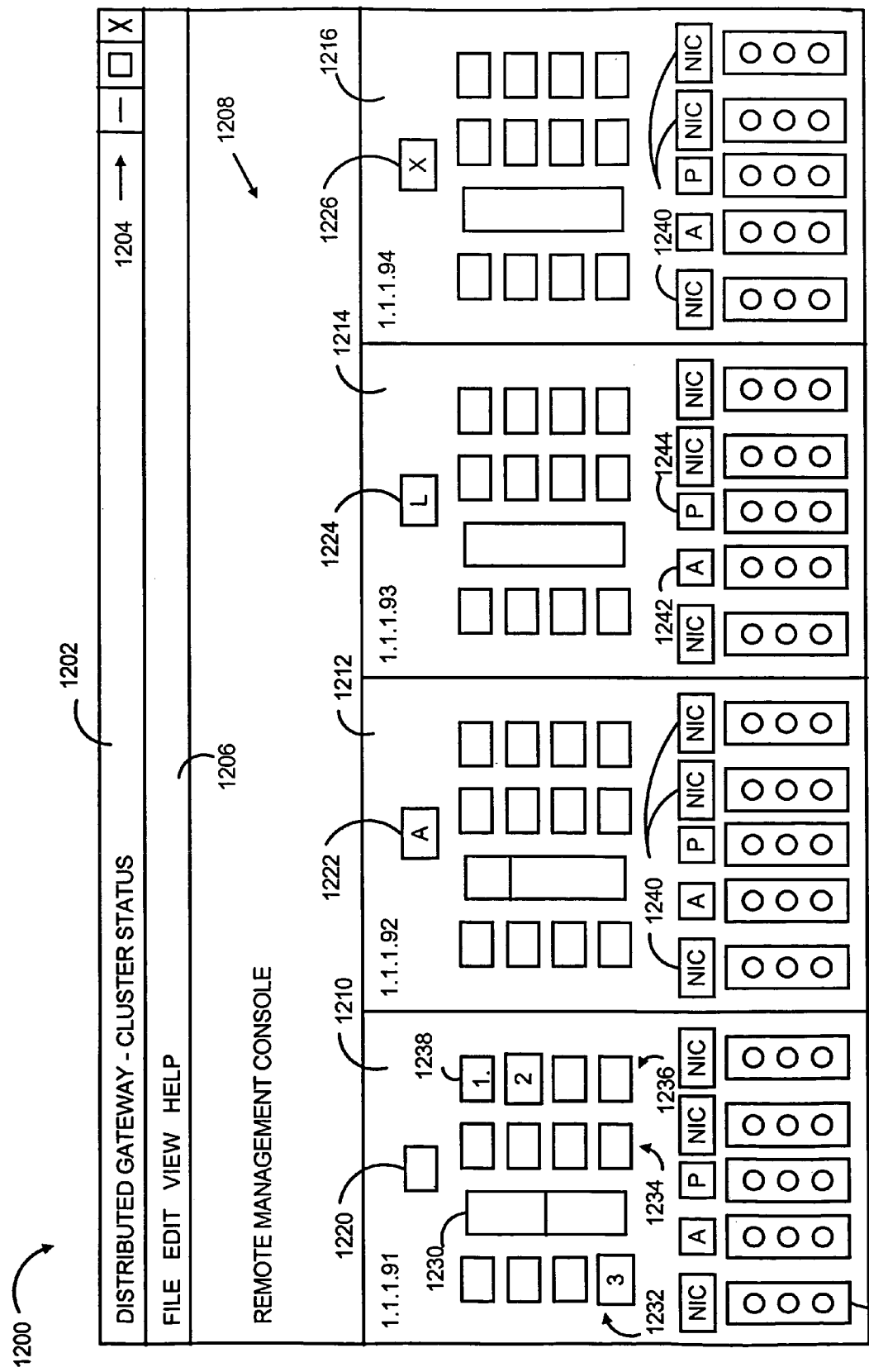
FIG. 12 is a representation of a GUI screen as shown on the display device of the FIG. 6 computer, in accordance with the present invention, for a Remote Management Console screen for running the distributed gateway cluster from a remote computer.

FIG. 12 is a representation of a GUI screen 1200 as shown on the display device of the FIG. 6 computer, in accordance with the present invention, for a Remote Management Console screen for running the distributed gateway cluster from a remote computer. The Remote Management Console is generated by the distributed gateway application software and permits setting operating parameters of the distributed gateway, as well as monitoring the functioning of the gateway. The screen 1200 shows the status of a single machine in the distributed gateway, selected in accordance with a secure procedure described further below.

The Remote Management Console screen 1200 is shown on the display device of the computer (FIG. 6) and, in accordance with a window operating system for a GUI, includes conventional program window artifacts. Thus, the display screen includes a window title bar 1202 across the top of the screen with window sizing icons 1204. A menu bar 1206 provides a means for selecting user actions, such as opening files, editing file contents and system parameters, changing the display details, and requesting help information. The lower part of the display screen 1200 includes a graphical representation of the gateway machines 1208.

Each respective gateway machine is represented in the Remote Management Console screen 1200 with a separate area. For example, in the illustrated embodiment, there are four virtual IP addresses for the machine being monitored, comprising (1.1.1.91), (1.1.1.92), (1.1.1.93), and (1.1.1.94). Thus, these four VIP addresses are represented by four separate screen areas 1210, 1212, 1214, 1216 containing various icons. In the preferred embodiment, the exact shape and theme of the icons can be selected by the user. A general boxed shape is used in the drawing figures, for simplicity of presentation. Where details of one screen area 1210, 1212, 1214, 1216 are provided, it should be understood that the explanation of such details also applies to the other display areas of the Remote Management Console display screen, as all of them are capable of showing the same information.

A Gateway icon 1220 shows the overall status of the particular distributed gateway machine, indicating whether the machine is operational for the virtual IP address and indicating which global options are enabled. In one standard representation form of the icon 1220, the icon indicates that the distributed gateway is fully functional. If an automatic rejoin feature is enabled, the Gateway icon includes an "AUTO" or "A" indication 1222. When automatic rejoin is enabled, the distributed gateway machine will attempt to rejoin a cluster after recovery from an error condition that has resulted in a failed machine. The error condition may comprise a failed NIC, a failed firewall application, and the like. In the preferred embodiment, the automatic rejoin feature is enabled as a default condition. In another option, a load balancing feature may be selected. Load balancing is indicated with a suitable Gateway icon display feature, such as "L.BAL" or "L" 1224. If load balancing is selected, the distributed gateway application will move virtual IP addresses from machines with higher traffic loads to machines with lower traffic loads, automatically during normal operation. Load balancing is enabled as a default condition. Finally, the Gateway icon indicates a failed or closed gateway virtual IP address with a suitable "CLOSED" or "X" icon 1226. A user may edit the condition of a gateway and force the gateway condition to be closed, in which condition it will remain until the user opens the gateway again.

In each gateway VIP address screen area 1210, 1212, 1214, 1216, a load bar 1230 shows the current byte traffic load being handled by the machine. The load bar is colored in a vertical "thermometer scale" reading to indicate traffic load, preferably on a logarithmic scale. If a user places the display cursor stationary over the load bar, the GUI will display the numerical value of the traffic load, after a predetermined time interval. On either side of the load bar 1230, columns of IP icons represent the virtual IP numbers managed by a particular machine. Each icon indicates a particular IP address of the internal or external VIP address pool. In the first screen area 1210, for example, the IP icons 1232 to the left of the load bar 1230 represent the internal VIP addresses, and the IP icons 1234, 1236 to the right of the load bar represent the external VIP addresses. A number or character in an IP icon 1232, 1234, 1236 indicates an IP address that is being managed or handled by the respective machine 1210, 1212, 1214, 1216. A blank icon indicates no assignment.

In accordance with the GUI and system operation, any VIP address can be set to stay on a particular distributed gateway machine by dragging and dropping the IP icons 1232, 1234, 1236 from a machine in one of the screen areas 1210, 1212, 1214, 1216 to a machine in a different one of the screen areas. It should be understood that the GUI will not permit dragging and dropping an IP icon from an external VIP area to an internal VIP area. When an IP icon is moved from one machine area to another, the IP address associated with the IP icon is moved to the new machine. If a user affirmatively moves an IP icon, the distributed gateway application will automatically set the "Preference" flag (described above with regard to the setup procedure) and will change the IP icon to indicate the setting of the "Preference" flag, such as by adding a red dot 1238 to the IP icon. As noted above, an IP address for which the user has indicated a preference assignment (either in setup or by dragging and dropping) will be moved by the distributed gateway application only if the preferred machine fails, or if the preference is removed by the user.

In the preferred embodiment, the GUI permits a user to set and change the VIP address options for a machine by using a conventional display mouse and right-clicking the display mouse when the display cursor is placed over an IP icon. The action of right-clicking causes the GUI to display a preferences menu that permits setting and removing an IP address preference. Setting the IP preference in this way means that the current machine assignment is the preferred assignment for the VIP address, so that the red dot 1238 will show.

Below the load bar 1230 and IP icons 1232, 1234, 1236 in each display screen area 1210, 1212, 1214, 1216 are placed local monitor icons and condition icons that indicate the status associated with the local monitor components. The local monitor icons include a NIC Load icon 1240, an Application Condition (firewall) icon 1242, and a Ping icon 1244. Each local monitor icon is an identifier that is associated with a condition icon placed directly below it. The condition icons illustrate three different condition levels for their respective associated components and are represented in the preferred embodiment as a traffic signal display.

For example, the NIC Load icon 1240 indicates that the traffic signal 1250 with which it is associated shows the status of the network interface card to the indicated subnet, or the status of the link for that card to the subnet. A red traffic signal (or top-most icon display indication) indicates that the distributed gateway software has detected that the NIC is not functioning properly. A yellow traffic signal (or mid-level icon display indication) indicates that the NIC is not being monitored by the distributed gateway software. That is, the NIC load monitoring feature is either disabled or not supported by the installed software for this component. A green traffic signal (or lower-most icon display indication) indicates that the NIC is functioning properly.

Similarly, the Application Condition icon 1242 indicates that the traffic signal icon 1252 with which it is associated shows the status of the application (firewall) on the local machine. A red traffic signal indicates that the distributed gateway software has detected that the firewall is not functioning properly, a yellow signal indicates that the firewall is not being monitored by the software, and a green signal indicates that the firewall is functioning properly. The Ping icon 1244 indicates the status of the ping remote monitor. Thus, a red signal indicates that no timely ping response was received, a yellow signal indicates that the Ping feature is not being monitored, and a green signal indicates that the last ping response was timely received.

The operation of any one of the particular local monitor components 1240, 1242, 1244 can be enabled and disabled by right-clicking on the traffic signal icon for the desired component. Enabling the monitor means that the given component (NIC, application, or ping) will be monitored. If the component is functioning properly, the associated traffic signal icon will be set to green when the component is enabled in this way. If the component has failed, the traffic signal will be set to red. If the component cannot be monitored, such as where a NIC is incompatible with the monitor software, the traffic signal will be set to yellow when the component is enabled in this way.

Remote Monitoring

As described above, the Remote Management Console display 1200 permits changing and monitoring the distributed gateway through the GUI. In accordance with the Remote Management Console and the operation of the distributed gateway software, the cluster can be changed and monitored as described above from any one of the cluster machines, and from a suitably configured remote machine external to the cluster. More particularly, a remote machine can be used if it can communicate with a machine of the cluster and if it has access to the appropriate GUI graphical components. Access to the GUI components can be achieved either by installation of the distributed gateway software on the remote machine, or if the appropriate GUI components can be delivered to the remote machine during the cluster monitoring. Such remote monitoring will first be enabled from a machine of the cluster using the Edit menu of the Remote Management Console screen.

Figure 13:
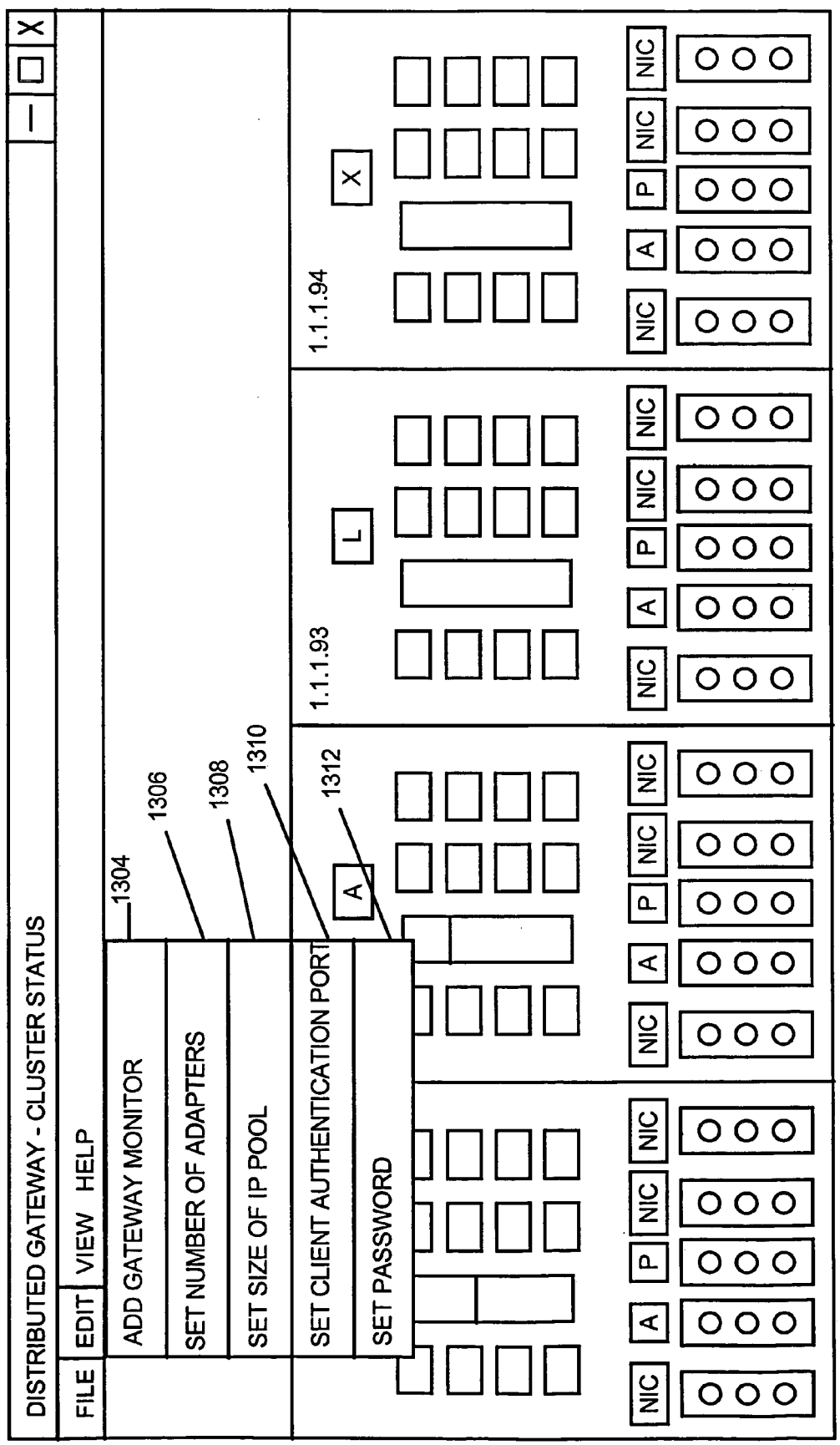
FIG. 13 is a representation of the Remote Management Console screen of FIG. 12, showing the Edit menu for entry of cluster configuration data.

FIG. 13 is a representation of the Remote Management Console screen 1200 of FIG. 12, showing the drop-down Edit menu selections. FIG. 13 shows the screen after a user has selected the Edit menu from the menu bar 1206 and caused the Edit menu 1302 to drop down from the menu bar. The menu selections include Add Gateway Monitor 1304, Set Number of Adapters 1306, Set Size of IP Pool 1308, Set Client Authentication Port 1310, and Set Password 1312. It should be noted that the first time the Remote Management Console is displayed after the distributed gateway software is installed, the details of the machines in the cluster will not be observed. Thus, neither a machine of the cluster or a remote machine may obtain the monitoring information from the display. The Edit menu 1302 must be selected and parameters set to enable monitoring of the cluster machines, as described below.

The Add Gateway Monitor function permits a user to enter a primary IP address for each gateway machine to be monitored. One IP address will be entered for each machine in the cluster. Ordinarily, the IP address of each machine in the cluster will be entered, so that each machine can be monitored. The Number of Adapters function is for entering the number of NICs to show for each machine. The default number of NICs is two, for a minimal cluster configuration, as this indicates connection of the machine to one external subnet and one internal subnet. The user entry in the Number of Adapters should match the number entered for the setup value, in the setup procedure described above.

The Set Size of IP Pool function permits a user to enter the size of the IP address pools, with a default number of four. This value defines the number of IP addresses managed by the distributed gateway on each subnet. The Set Client Authentication Port function involves connecting via a telnet operation to a port on the Application (firewall) machine. This ensures communication between the distributed gateway software and the application software (such as the firewall) with which it works.

The Set Password function provides a means of authenticating a user who wishes to gain access to the cluster monitoring information. The password entered here will be used to permit a remote user to communicate with a machine in the cluster. It should be noted that this authentication password does not guarantee access to the distributed gateway software and to information from the Remote Monitoring Console. Rather, a separate cluster password is necessary, in addition to the authentication password. The cluster password is preferably set only by a user at a cluster machine, using a local administrative utility program of the distributed gateway software. In the preferred embodiment, the distributed gateway software provides a "Change Service Password" option from the software "Start" menu that, when selected from a cluster machine, permits an authorized user to set the cluster password. In this way, a setup user specifies a password that must be provided when connecting to the cluster.

Finally, the distributed gateway software includes a command line interface utility program that provides an alternative to the GUI. The command line interface permits the same control as the Remote Monitoring Console of the GUI. That is, just as an authorized user may remotely connect to a cluster machine and view the GUI display to determine the status of the cluster, an authorized user may remotely connect to a cluster machine and receive cluster status information from a text-based, command line interface. The command line interface will appear in a text window, in a conventional manner that will be familiar to those skilled in the art.

In the preferred embodiment, the command line interface will report the local status of the machine to which a remote user connects or of the local machine at which a user has invoked the command line interface, and will also report on the global status of the cluster. The global status information may be retrieved by connecting to any machine of the cluster. In addition, a remote user may move VIP address assignments from one machine to another by connecting to any machine of the cluster. It should be noted, however, that the command line interface will return a success indication (that is, a no error condition) if the command from the remote machine is successfully communicated to the cluster machine, but the command line interface does not determine if the remote machine actually carries out the requested action. Such information is available when communicating with the GUI.

Thus, the distributed gateway constructed in accordance with the invention dynamically reconfigures traffic assignments among multiple machines for increased network availability. The distributed gateway moves traffic assignments among the multiple machines if one of the gateway machines becomes unavailable, such that network availability is substantially unchanged. The machines of the distributed gateway communicate with each other such that automatic, dynamic traffic assignment reconfiguration occurs in response to machines being added and deleted, with and no loss in functionality for the gateway cluster overall, in a process that is transparent to local network users, thereby providing a distributed gateway functionality that is scalable. Each machine of the gateway can advantageously continue with its operational functions, such as operating firewall software, while participating in the distributed gateway and dynamic reconfiguration processing. In this way, the invention substantially maintains network availability regardless of machine failures, so that there is no single point of failure and no lapse in gateway functionality.

Improved State Sharing Protocol

A network gateway server cluster constructed in accordance with the present invention includes multiple gateway server computers, also called traffic control computers, that function as a front layer gateway of a first subnet between the network and a back-end layer that includes multiple machines of a second subnet. The front-layer servers provide a scalable, distributed, highly available, load balancing server system that performs fail-over and dynamic load balancing for both server layers. The front-layer servers achieve their unique functionality with a dynamic reconfiguration protocol that permits reassignment of network addresses to the front layer machines and supports state information sharing and CPU load information sharing among the front-layer servers. To provide such functionality, the front-layer servers utilize a token scheme in an expanded format compared to that described above.

The server cluster configuration and address assignment are achieved through the operation and protocol word scheme previously described. As noted above, a variety of unique functional features are provided by a gateway server cluster constructed and operated in accordance with the invention. The unique functional features will be described next.

Consistent State Sharing

Consistent state sharing among the servers in the cluster is important for the distributed server application in accordance with the invention. In this embodiment, the Group Membership Protocol Word described above in Section A is expanded and generalized to create a general Consistent State Sharing scheme. This Consistent State Sharing mechanism is reliable, has low-overhead, and serves as the core to enable other features of the front-layer distributed server system.

The foundation of the Consistent State Sharing mechanism is a Reliable Message layer that is implemented with the distributed gateway server application software. In this embodiment, the Reliable Message layer sits on top of UDP (that is, it uses UDP to send data) and comprises a module of the application software. It has an acknowledgement and automatic resend mechanism that enables reliable delivery of data. Its main differentiation with TCP is that, first, it is a connectionless protocol; secondly, it supports multiple subnet transport; furthermore, in the case of delivery failure, it calls a call-back function from the layer above it.

Upper layer software, comprising modules of the distributed server application, can send a message of any size using the Reliable Message layer. The sender-side operation of the Reliable Message layer partitions the message being sent into a number of packets. It sends all packets using UDP, creating a record for each packet as well as for the message. When the timeout of any packet expires, it resends that packet, and doubles the timeout value. After a predetermined number of resends using all possible paths, if the Reliable Message layer still fails to receive acknowledgement, the Reliable Message layer will call the callback function to notify the upper layer software, passing it the record of the original message. On the other hand, after all packets have been acknowledged by the receiver, the Reliable Message layer cleans the records for the packets and for the message by deletion. The upper layer software comprises any software calling the Reliable Message layer for messaging.

On the receiver side of the Reliable Message layer processing, for every packet received, the Reliable Message layer sends out an acknowledgement. The Reliable Message layer of a front layer server maintains a buffer in which it places the packets, until all packets for a message are received. When all packets are received, the Reliable Message layer asks the upper layer software to process the message.

Figure 14:
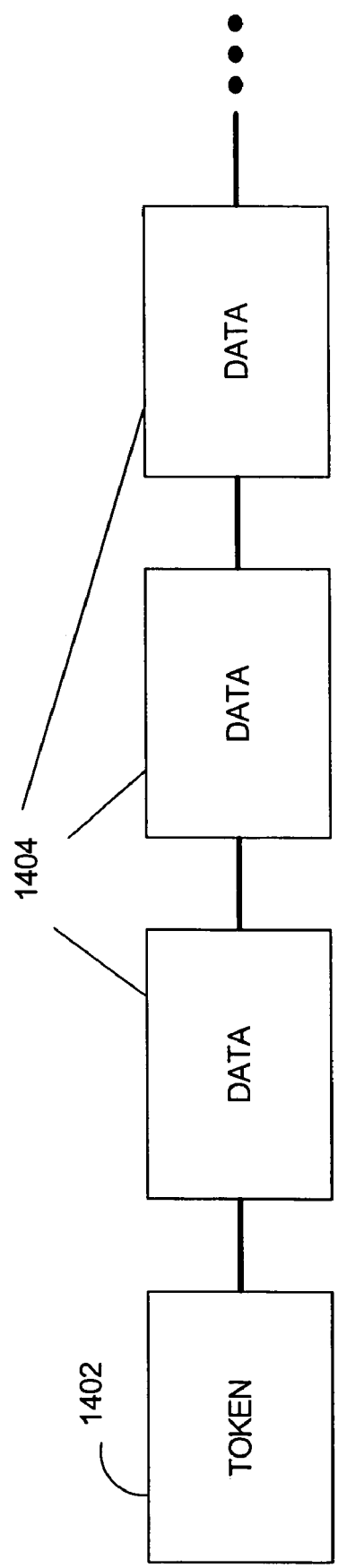
FIG. 14 is a representation of a token message train, sent by the distributed gateway servers illustrated in FIG. 3.

With the creation of the Reliable Message layer, this embodiment provides consistent state sharing with a reliable message passing interface. In this consistent state sharing scheme, the token described in the Group Membership Protocol Word serves as the "locomotive" of a state-sharing "train". This is illustrated in FIG. 14. The "locomotive" 1402 can have an arbitrary number of data modules 1404 attached to it, like carriages of a train. This is achieved with a data field in the token header that specifies the number of data modules (carriages) associated with the token (locomotive). The token 1402, together with the data modules 1404, becomes a message. Thus, the Reliable Message layer is a means of transporting this message. This message travels in a token ring fashion around all the members of the gateway server cluster, as described above. Each member of the cluster can load and unload information onto or from the message train, changing the token header to specify the number of data modules, as needed.

Currently, the data that travels on the consistent state sharing mechanism described above include Virtual IP information, cluster configuration information, node fault and load monitoring information, connection information, server monitoring information. Other types of information may be added, as needed.

Dynamic Address Assignment without Reboot

Some server operating systems will not permit changing the IP address of a server without rebooting the server. Rebooting a server machine involves shutting down the server and reapplying power. It should be apparent that the server is unavailable while the reboot is performed, and therefore rebooting a server can cause a critical lapse of server availability and should be avoided. A gateway server constructed in accordance with the present invention provides a distributed gateway server that advantageously permits network address assignments to be moved from one distributed server to another of a gateway cluster without requiring rebooting. This is achieved by "hiding" the IP address reassignment from the server operating system (OS) software of the cluster machines. The OS may comprise, for example, the "Windows NT Server" operating system produced by Microsoft Corporation of Redmond, Wash., USA installed on the server machine.

Figure 15:
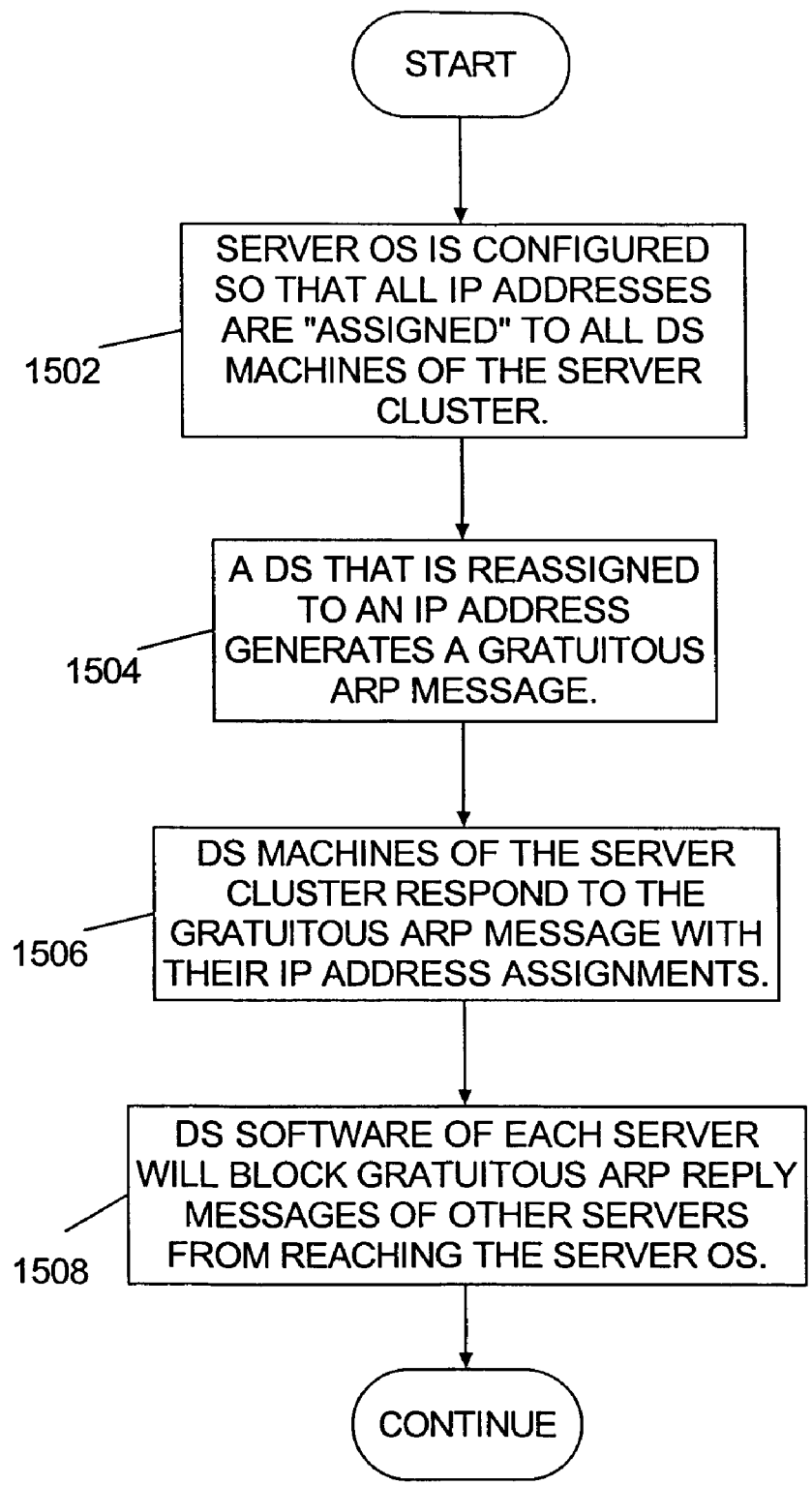
FIG. 15 is a flow diagram that shows the operating process of a distributed gateway in the system of FIG. 3 to provide IP address reassignment without server OS rebooting.

FIG. 15 shows the operating process of a distributed server in accordance with the invention. In the first operation, represented by the flow diagram box numbered 1502, the server OS is configured so that all IP addresses are assigned to all distributed server machines of the server cluster. That is, the OS of each distributed server in the cluster configured upon installation such that all IP addresses to be shared are, in the view of the OS, assigned to all of the cluster servers. This permits flexibility in assigning the IP addresses to any one of the cluster servers without rebooting, because any IP address reassignment is transparent to the server OS. Thus, to the server OS, it appears that no IP address reassignment ever occurs, and therefore no rebooting is ever needed.

In the next operation, represented by the flow diagram box numbered 1504, a distributed server (DS) that is reassigned by the server application (FIG. 4) to a new IP address will generate a gratuitous ARP message, as described above. The other distributed servers of the server cluster respond to the gratuitous ARP message with their particular IP address assignment, per the description above (FIG. 9). This operation is represented by the flow diagram box numbered 1506. Lastly, to prevent OS rebooting, the distributed server application software of each distributed server will block the ARP reply messages of the cluster servers from being detected by their respective server OS, by discarding the reply messages. This operation is indicated by the flow diagram box numbered 1508. In this way, it is guaranteed that there is no IP address conflict, because each server OS is unaware of the machines having duplicate IP numbers. For each virtual IP, at any time, only one server is answering the ARP request, and therefore the mutual exclusivity of the virtual IP addresses is maintained.

Symmetric Traffic Routing

Another feature provided by the server system constructed in accordance with the invention is that of symmetric routing of network traffic among the cluster machines. This is advantageous because a cluster of front layer servers may assign a distributed gateway server to handle incoming traffic to be forwarded to a machine on another subnet, but that distributed server may be different from the default server that will be used by the subnet machine. Thus, the distributed server handling incoming traffic destined for a subnet machine will not be the same distributed server that receives return responses from the subnet machine. This results in asymmetric traffic loading among the distributed servers, and is undesirable in some cases where symmetric routing is required. In accordance with the invention, the distributed servers of a gateway server cluster will forward data traffic among the machines in the cluster to ensure that data traffic enters and leaves the cluster from the same distributed server, thereby providing symmetric routing.

Figure 16:
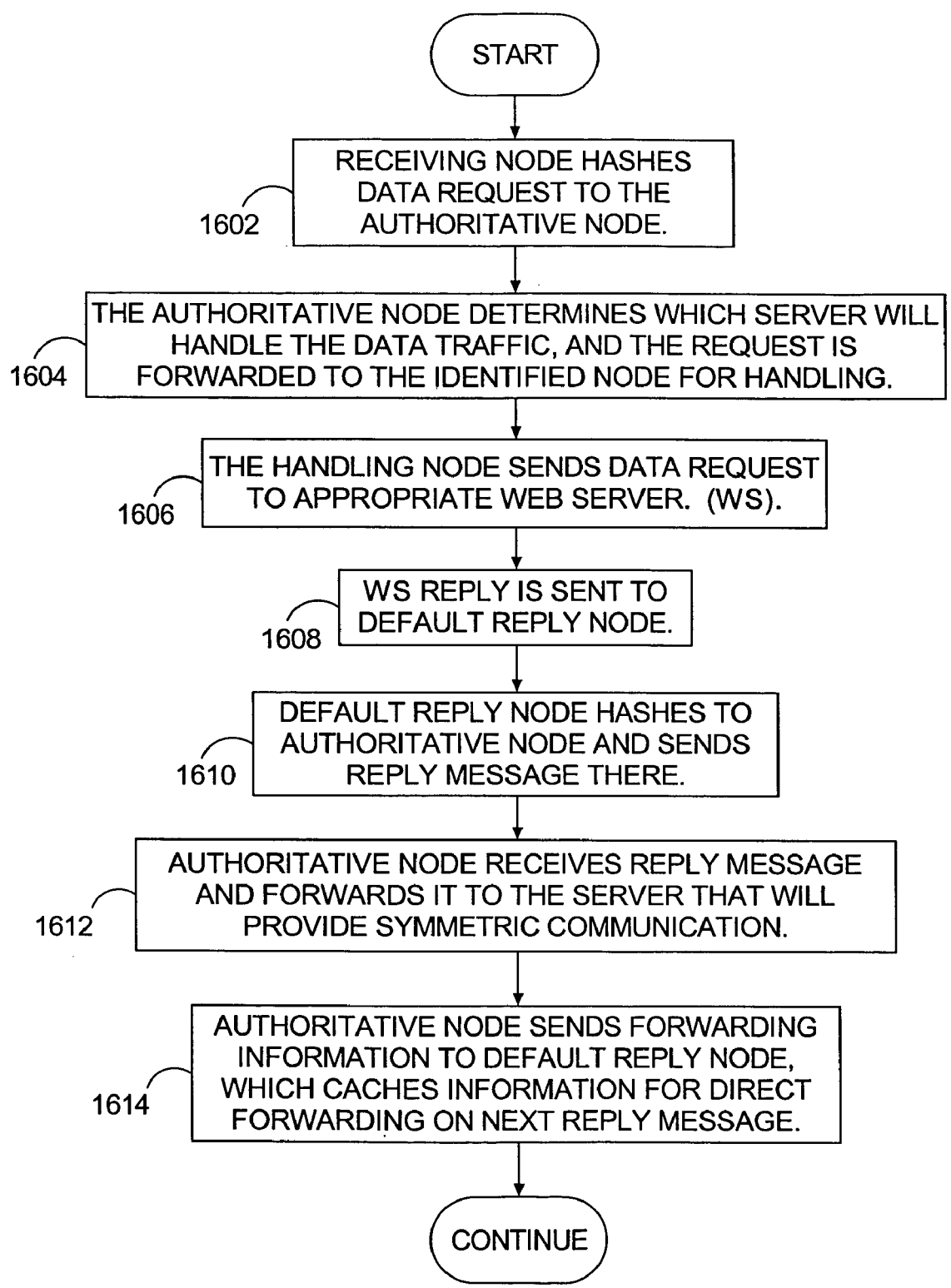
FIG. 16 is a flow diagram that shows the operation of a distributed gateway in the system of FIG. 3 to provide symmetric routing of traffic through the gateway server cluster.

FIG. 16 is a flow diagram that illustrates the operation of the server cluster to implement symmetric traffic handling in accordance with the invention. For a server cluster having distributed servers as described above, one of the distributed servers is assigned to be an "authoritative" server, or authoritative node, for the server cluster. This assignment is carried out by the front-layer server constructed in accordance with the present invention.

In the first step of operation illustrated in FIG. 16, as represented by the flow diagram box numbered 1602, a server, or node, of the server cluster receives a data request from a client machine and hashes the data request to determine which server node will be the authoritative node for the request. It should be understood that different nodes of the server cluster may be assigned "authoritative nodes" for different data requests, depending on the IP addresses (of destination Web server) involved. Once the authoritative node is identified, the data request is forwarded from the receiving node to the authoritative node. This operation comprises the operation identified by the box 1602.

When the authoritative node receives the data request, the authoritative node determines which distributed server in the server cluster will handle the data traffic associated with this request from this client to the designated Web server. When the authoritative node identifies the handling node, it forwards the data request to the identified node for handling. This operation is represented by the flow diagram box numbered 1604. Next, as represented by the flow diagram box numbered 1606, the handling node receives the data request and sends it along to the appropriate Web server for response. The Web server (WS) response is sent to a default node of the server cluster. Those skilled in the art will know that a Web server typically has a default upstream router (toward the Internet) to which it sends replies to data requests. Sending the Web server reply to the default reply node is represented by the flow diagram box numbered 1608.

Next, as represented by the flow diagram box numbered 1610, the default reply node hashes the received data request reply to the authoritative node for replies, and sends the reply message to that authoritative reply node. The authoritative reply node receives the reply message and forwards it to the server node that will ensure symmetric communication. That is, the authoritative reply node will determine the node of the server cluster that first received the data request from the client, and will forward the reply message to that node. In this way, the data request passes to and from the server cluster through the same distributed server, thereby providing symmetric communication. This operation is represented by the flow diagram box numbered 1612.

Finally, in an optimization step, the authoritative node sends forwarding information to the default reply node. The default reply node stores this information, which indicates the node to which the authoritative node forwarded the reply for symmetric communication. On subsequent reply messages received at the default reply node, the distributed server of the default reply node will know which server should receive the reply message, and will directly forward the reply message to that node. Thus, the default reply node can skip the step of sending the reply message to the authoritative node. This operation is represented by the flow diagram box numbered 1614.

Figure 17:
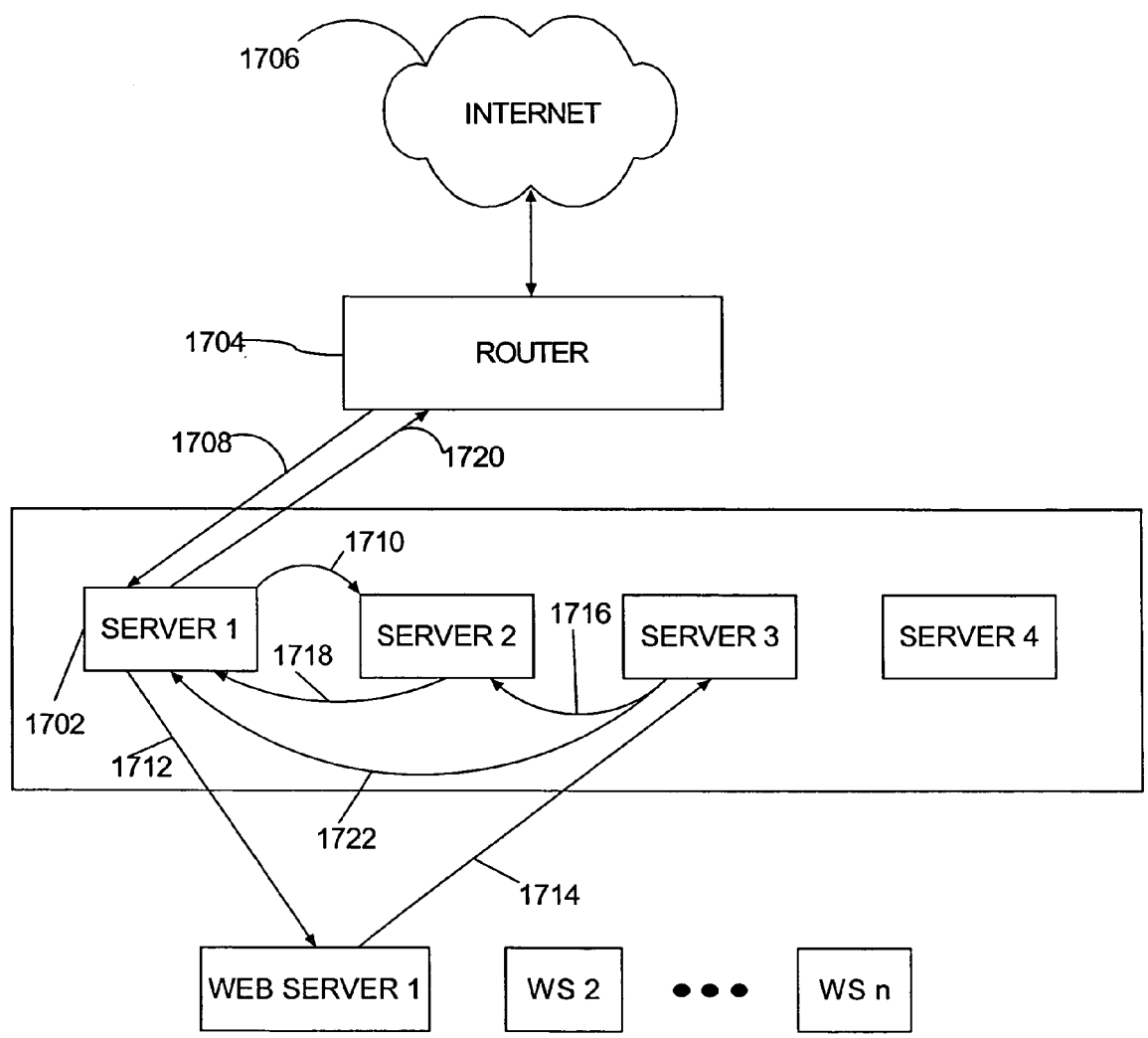
FIG. 17 is a schematic block diagram that illustrates the data traffic in the server cluster operation according to FIG. 16.

FIG. 17 diagrammatically illustrates the operation described in connection with FIG. 16. A server cluster 1702 receives data requests from a router 1704 that interfaces to the Internet 1706. The data request is received at Server 1 of the server cluster, in accordance with IP address assignments and operation of the cluster, as indicated by the data path 1708. The receiving node Server 1 hashes the request to the authoritative node, which in this example is Server 2, as indicated by the arrow 1710. The authoritative node determines the Web server that will handle the data request, and the data request is then forwarded to Web Server 1, which is the destination Web server. In the preferred embodiment, the authoritative server informs the receiving node Server 1, which forwards the data request. This processing is represented by the data path 1712.

The sequence 1710 corresponds to the box 1602 of the FIG. 16 flow diagram, and the sequence 1712 corresponds to box 1604 and box 1606 of FIG. 16.

The reply message is sent from Web Server 1 to the default reply node for Web Server 1, which in this example is Server 3 of the server cluster. The default reply data path is represented by the arrow 1714 (corresponding to box 1608 of FIG. 16). At the default reply node (Server 3), the reply node hashes the reply message to determine that the authoritative reply node for this message is Server 2, and then forwards the reply to Server 2. The forwarding operation is indicated by the arrow 1716. Finally, Server 2 forwards the reply to Server 1, which is the node needed to ensure symmetric operation of the cluster, in the operation represented by the arrow 1718. Server 1 then sends the reply back to the requesting client, through the router 1704, per the path 1720.

The operation of 1716 corresponds to the operation of the FIG. 16 box 1610, and the operation of 1718 corresponds to the FIG. 16 flow diagram box numbered 1612.

In the optimization step, Server 2, the authorization reply node, informs Server 3, the default reply node, that the server ultimately returning the reply message is Server 1. Therefore, Server 3 will store this information and send reply messages from Web Server 1 directly to Server 1, bypassing an intermediate step. This processing is indicated by the arrow 1722 (and corresponds to the FIG. 16 box 1614).

The authoritative servers can, if desired, perform load balancing operations in accordance with well-known techniques for adjusting load among the servers. Both the receiving node and the handling node will cache the assignment data that are provided by the authoritative nodes. The technique described above for the symmetric routing can be applied to a variety of gateway server functions. Such symmetric load balancing capability is advantageous because some server functions, such as firewalls, may change certain IP address and port settings, which may result in changed hashing values. The operation as described above can be used to detect connection changes (detecting as changes to client or server IP address and port, or changes to protocol type) and then to restore symmetry.

The present invention has been described above in terms of presently preferred embodiments so that an understanding of the present invention can be conveyed. There are, however, many configurations for network data traffic controllers not specifically described herein but with which the present invention is applicable. The present invention should therefore not be seen as limited to the particular embodiments described herein, but rather, it should be understood that the present invention has wide applicability with respect to network data traffic controllers generally. All modifications, variations, or equivalent arrangements and implementations that are within the scope of the attached claims should therefore be considered within the scope of the invention.

We claim:

1. A data traffic controller for a computer network, the data traffic controller comprising:

a network interface that permits communication with a subnet over which network data is sent and received; and a plurality of computers connected in a cluster between the network interface and the subnet to form a distributed gateway for communicating network data between said network interface and said subnet, each of which computers executes a distributed gateway application that dynamically assigns any of a plurality of virtual network addresses selected from a pool of virtual addresses to any of a plurality of primary network addresses to send network data to an intended host on the subnet, wherein network data intended for said host on the subnet is addressed to one of the virtual network addresses, and wherein the computers communicate operational status information among themselves for each computer on the same subnet using a group membership protocol word to dynamically reconfigure network data traffic assignments among the plurality of computers in response to said status information for said dynamic assignment of virtual network addresses, wherein one computer can configure and monitor the operating condition of another computer in the distributed gateway cluster.

2. A method of controlling data traffic for a computer network through a cluster of a plurality of computers connected as a distributed gateway between a network interface and a subnet over which network data is sent and received, the method comprising:

receiving network data intended for a host on the subnet at said plurality of computers, wherein the network data is addressed to one of a plurality of virtual network addresses selected from a pool of virtual network addresses that are on the subnet and are associated with one or more primary network addresses;

communicating by a computer with one or more of said plurality of computers on the same subnet operational status information about said one or more computers; and dynamically assigning by said plurality of computers in response to said status information said one virtual network address to a primary network address to send the network data to the intended host on the subnet, wherein a computer can configure and monitor the operating condition of another computer in the distributed gateway cluster.

3. A method of controlling data traffic as defined in claim 2, wherein said computers comprise server computers that are all members of a first subnet of network addresses over which network data is sent and received, and further comprising:

communicating with the plurality of server computers state information and load information with a dynamic reconfiguration protocol that permits reassignment of network addresses among the server computers in response to said state information and said load information, said status information comprising said state information and said load information; and communicating between said server computers and a plurality of host computers that are members of a host subnet of network addresses to send and receive network data traffic.

4. A method as defined in claim 3, wherein communicating with said plurality of server computers comprises sending data using a Reliable Message layer scheme that comprises a token data packet and one or more data carriage packets, wherein the token data packet specifies the number of data carriage packets that together comprise a Reliable Message packet and wherein the data carriage packets include data relating to state information and data traffic load information about each of the server computers.

5. A method as defined in claim 3, further including:

configuring an operating system of the server computers such that all network addresses in a pool of addresses assigned to the first subnet are assigned to the server computers;

generating a gratuitous address resolution protocol (ARP) message in response to an address reassignment of one server computer and communicating the ARP message to the other server computers of the first subnet;

blocking the sending of an ARP acknowledgment message to the other server computers of the first subnet for any received gratuitous ARP message, thereby inhibiting reboot operation of the respective server computers and ensuring that each server computer is unaware of any duplicate assignment of network address numbers.

6. A method as defined in claim 3, further including operating as an authoritative node of the first subnet to ensure symmetric routing of network data traffic to and from the first subnet.

7. A method as defined in claim 6, wherein operating to ensure symmetric traffic routing comprises:

receiving a data request from a responding server computer of the first subnet, wherein the data request was initially received at the responding server computer, which determined the authoritative node for responding to the data request;

identifying a server computer in the first subnet that will handle the data traffic associated with the data request and forwarding the data request to the identified server computer for handling;

receiving a reply message from a server computer of the first subnet that is operating as a default reply node to a second subnet computer that is responding to the data request; and forwarding the reply message to a server computer of the first subnet that will ensure symmetric routing of the data request and reply message with respect to the server computers of the first subnet.

8. A method as defined in claim 7, further comprising forwarding assignment information to the server computer of the first subnet that was operating as the default reply node for the data request, wherein the assignment information includes forwarding information that the default reply node can use to directly forward response messages from the second subnet computer to the first subnet computer that will ensure symmetric routing.

9. A data traffic controller as defined in claim 1, wherein the operational status includes the network data traffic loads being carried by each computer.

10. A data traffic controller as defined in claim 9, wherein a computer communicates with the other computers on the same subnet to form said distributed gateway.

11. A data traffic controller as defined in claim 10, wherein the computers dynamically reconfigure the address assignments among the distributed gateway computers in response to traffic loads being carried by the computers.

12. A data traffic controller as defined in claim 11, wherein a computer determines that it is carrying a traffic load that is less than the traffic load being carried by one of the other computers of said plurality, and in response reconfigures the address assignments to assume a portion of the traffic load being handled by the one other computer and thereby reduces the traffic load of the one other computer.

13. A data traffic controller as defined in claim 11, wherein the traffic load being carried by a computer of the distributed gateway cluster increases when another one of the computers in the distributed gateway cluster becomes unavailable, and in response the the computers reconfigure the traffic load being handled by the computers.

14. A data traffic controller as defined in claim 11, wherein operations of the data traffic controller are substantially unchanged after a reconfiguration of the address assignments, thereby making the reconfiguration transparent to a user.

15. A data traffic controller as defined in claim 14, wherein the operations of the data traffic controller include one or more computer application programs.

16. A data traffic controller as defined in claim 15, wherein the computer application program comprises a firewall program.

17. A data traffic controller as defined in claim 15, wherein the computer application program comprises a mail server program.

18. A data traffic controller as defined in claim 15, wherein the computer application program comprises a file server program.

19. A data traffic controller as defined in claim 10, wherein upon a new computer communicating with the plurality of computers of the distributed gateway cluster of computers already communicating among themselves, the new computer joins the distributed gateway cluster.

20. A data traffic controller as defined in claim 19, wherein the computers of the distributed gateway cluster recognize that the new computer has a lower traffic load than the remaining computers of the distributed gateway cluster when the new computer joins the cluster, and in response the new computer assumes a portion of the traffic load from one or more of the computers in a process that dynamically reconfigures the traffic address assignments of the computers.

21. A data traffic controller as defined in claim 19, wherein the computers of the cluster detect when the new computer begins communicating with the cluster, thereby joining the cluster, and in response the computers perform a dynamic reconfiguration process to change one or more traffic address assignments from the computers to the new computer.

22. A data traffic controller as defined in claim 1, wherein a computer communicates by passing said group membership protocol word to the other computers along the subnet.

23. A data traffic controller as defined in claim 22, wherein the group membership protocol word includes node map configuration data indicating traffic assignments for each one of the computers in the distributed gateway cluster.

24. A data traffic controller as defined in claim 22, wherein the group membership protocol word includes data that indicates the traffic load being carried by each computer in the distributed gateway cluster.

25. A data traffic controller as defined in claim 9, wherein a computer can receive a user input that specifies a configuration or monitoring change for another computer, and can receive the user input from a remote user.

26. A data traffic controller as defined in claim 10, wherein the data traffic controller performs the dynamic reconfiguration of address assignments through a graphical user interface (GUI).

27. A data traffic controller as defined in claim 26, wherein subnet virtual network addresses and traffic address assignments are graphically represented, and the reconfiguration of address assignments can be performed by a drag and drop action of traffic address assignments onto subnet virtual network addresses.

28. A data traffic controller as defined in claim 26, wherein the GUI includes a local status monitor indicator for the network interface.

29. A data traffic controller as defined in claim 26, wherein the GUI includes a local condition monitor indicator for the application program of the data traffic controller.

30. A data traffic controller as defined in claim 26, wherein the GUI includes a local condition monitor indicator for a ping communication utility.

31. A method as defined in claim 2, wherein the operational status includes the network data traffic loads being carried by each computer.

32. A method as defined in claim 31, wherein each computer communicates with the other computers on the same subnet and thereby forms a distributed gateway cluster of computers.

33. A method as defined in claim 32, further including the computers dynamically reconfiguring the address assignments among the distributed gateway cluster computers in response to traffic loads being carried by the computers.

34. A method as defined in claim 33, wherein reconfiguring comprises a computer determining that it is carrying a traffic load that is less than the traffic load being carried by one of the other computers, and in response reconfiguring the address assignments to assume a portion of the traffic load being handled by another computer and thereby reducing the traffic load of the other computer.

35. A method as defined in claim 33, wherein the traffic load being carried by the other computer increases when one of the remaining computers in the distributed gateway cluster becomes unavailable, and in response the computers reconfigure the traffic load being handled by the computers.

36. A method as defined in claim 33, wherein reconfiguring the address assignments results in substantially no change in the operations of the data traffic controller, thereby making the reconfiguration transparent to a user.

37. A method as defined in claim 36, wherein the operations of the data traffic controller include one or more computer application programs.

38. A method as defined in claim 37, wherein the computer application program comprises a firewall program.

39. A method as defined in claim 37, wherein the computer application program comprises a mail server program.

40. A method as defined in claim 37, wherein the computer application program comprises a file server program.

41. A method as defined in claim 32, wherein upon a new computer communicating with a computer of the distributed gateway cluster of computers already communicating among themselves, said new computer joins the distributed gateway cluster.

42. A method as defined in claim 41, wherein the computers of the distributed gateway cluster recognize that a joining computer has a lower traffic load than the computers of the distributed gateway cluster when the computer joins the cluster, and in response the joining computer assumes a portion of the traffic load from one or more of the computers in a process that dynamically reconfigures the traffic address assignments of the cluster.

43. A method as defined in claim 41, wherein upon detecting when a new computer begins communicating with the cluster, thereby joining the cluster, performing a dynamic reconfiguration process to change one or more traffic address assignments from the computers of the cluster to the new computer.

44. A method as defined in claim 41, wherein said communicating comprises passing a group membership protocol word to the computers of the subnet.

45. A method as defined in claim 44, wherein the group membership protocol word includes node map configuration data indicating traffic assignments for each one of the computers in the distributed gateway cluster.

46. A method as defined in claim 44, wherein the group membership protocol word includes data that indicates the traffic load being carried by each computer in the distributed gateway cluster.

47. A method as defined in claim 31, wherein a computer can receive a user input that specifies a configuration or monitoring change for another computer, and can receive the user input from a remote user.

48. A method as defined in claim 32, wherein said dynamically assigning comprises dynamic reconfiguration of address assignments through a graphical user interface (GUI).

49. A method as defined in claim 48, wherein the subnet virtual network addresses and traffic address assignments are graphically represented, and the reconfiguration of address assignments comprises a drag and drop action of traffic address assignments onto subnet virtual network addresses.

50. A method as defined in claim 48, wherein the GUI includes a local status monitor indicator for the network interface.

51. A method as defined in claim 48, wherein the GUI includes a local condition monitor indicator for the application program of the data traffic controller.

52. A method as defined in claim 48, wherein the GUI includes a local condition monitor indicator for a ping communication utility.

53. A program product for use in a computer of a plurality of computers connected in a cluster as a distributed gateway between a network interface and a subnet of a computer network over which network data is sent and received, wherein the network data is received through the network interface and communicated through the computer cluster to the subnet, the program product comprising:

a recordable medium embodying computer-readable instructions executable by the computers to perform a method comprising:

receiving by said plurality of computers network data intended for a host on the subnet, wherein the network data is addressed to one of a plurality of virtual network addresses selected from a pool of virtual network addresses that are on the subnet and are associated with one or more primary network addresses;

communicating among one or more of said plurality of computers on the same subnet operational status information about said computers; and dynamically assigning by said plurality of computers of said cluster in response to said communicating said status information said virtual network address to a primary network address to send the network data to the intended host on the subnet, thereby controlling network data traffic, wherein a computer can configure and monitor the operating condition of another computer in the distributed gateway cluster.

54. A program product as defined in claim 53, wherein the operational status includes the network data traffic loads being carried by each computer.

55. A program product as defined in claim 54, wherein a computer communicates with the other computers on the same subnet and thereby forms a distributed gateway cluster of computers.

56. A program product as defined in claim 55, further including dynamically reconfiguring the address assignments among the distributed gateway cluster computers in response to traffic loads being carried by the computers.

57. A program product as defined in claim 56, wherein said reconfiguring comprises a computer determining that it is carrying a traffic load that is less than the traffic load being carried by one of the other computers, and in response reconfiguring the address assignments to assume a portion of the traffic load being handled by the other computers and thereby reducing the traffic load of the other computers.

58. A program product as defined in claim 56, wherein the traffic load being carried by the other computer increases when one of the other computers in the distributed gateway cluster becomes unavailable, and in response reconfiguring the traffic load being handled by the other computers.

59. A program product as defined in claim 56, wherein operations are substantially unchanged after a reconfiguration of the address assignments, thereby making the reconfiguration transparent to a user.

60. A program product as defined in claim 58, wherein the operations of the data traffic controller include one or more computer application programs.

61. A program product as defined in claim 60, wherein the computer application program comprises a firewall program.

62. A program product as defined in claim 60, wherein the computer application program comprises a mail server program.

63. A program product as defined in claim 60, wherein the computer application program comprises a file server program.

64. A program product as defined in claim 55, wherein a computer begins communicating with a distributed gateway cluster of computers already communicating among themselves, thereby joining the distributed gateway cluster.

65. A program product as defined in claim 64, wherein the computers of the distributed gateway cluster recognize that a computer has a lower traffic load than the remaining computers of the distributed gateway cluster when the computer joins the cluster, and in response the computer assumes a portion of the traffic load from one or more of the computers in a process that dynamically reconfigures the traffic address assignments of the cluster.

66. A program product as defined in claim 64, wherein the computers detect when a new computer begins communicating with the cluster, thereby joining the cluster, and in response the computers perform a dynamic reconfiguration process to change one or more traffic address assignments to the new computer.

67. A program product as defined in claim 54, wherein a computer communicates by passing a group membership protocol word to the other computers along the subnet.

68. A program product as defined in claim 67, wherein the group membership protocol word includes node map configuration data indicating traffic assignments for each one of the computers in the distributed gateway cluster.

69. A program product as defined in claim 67, wherein the group membership protocol word includes data that indicates the traffic load being carried by each computer in the distributed gateway cluster.

70. A program product as defined in claim 54, wherein a computer can receive a user input that specifies a configuration or monitoring change for another computer, and can receive the user input from a remote user.

71. A program product as defined in claim 55, wherein the data traffic controller performs the dynamic reconfiguration of address assignments through a graphical user interface (GUI).

72. A program product as defined in claim 71, wherein the subnet virtual network addresses and traffic address assignments are graphically represented, and the reconfiguration of address assignments can be performed by a drag and drop action of traffic address assignments onto subnet virtual network addresses.

73. A program product as defined in claim 71, wherein the GUI includes a local status monitor indicator for the network interface.

74. A program product as defined in claim 71, wherein the GUI includes a local condition monitor indicator for the application program of the data traffic controller.

75. A program product as defined in claim 71, wherein the GUI includes a local condition monitor indicator for a ping communication utility.

* * * * *